US012182790B2

(12) United States Patent
Rezayee et al.

(10) Patent No.: US 12,182,790 B2
(45) Date of Patent: *Dec. 31, 2024

(54) SYSTEMS AND METHODS FOR PERFORMING TRANSACTIONS

(71) Applicant: Block, Inc., Oakland, CA (US)

(72) Inventors: Afshin Rezayee, Richmond Hill (CA); Emad Bidari, Toronto (CA); Thomas Templeton, Piedmont, CA (US); Michael Lamfalusi, Cupertino, CA (US); Matthew H. Maibach, San Francisco, CA (US); Jesse L. Dorogusker, Palo Alto, CA (US)

(73) Assignee: Block, Inc., Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/238,211

(22) Filed: Aug. 25, 2023

(65) Prior Publication Data

US 2023/0401556 A1 Dec. 14, 2023

Related U.S. Application Data

(63) Continuation of application No. 17/714,016, filed on Apr. 5, 2022, now Pat. No. 11,783,312, which is a (Continued)

(51) Int. Cl.
*G06Q 20/32* (2012.01)
*G06K 7/10* (2006.01)
(Continued)

(52) U.S. Cl.
CPC ....... *G06Q 20/321* (2020.05); *G06K 7/10148* (2013.01); *G06K 7/10297* (2013.01);
(Continued)

(58) Field of Classification Search
CPC .............. G06Q 20/321; G06Q 20/401; G06K 7/10148; G06K 7/10297; G06K 19/0709;
(Continued)

(56) References Cited

U.S. PATENT DOCUMENTS 9,861,314 B2  1/2018  Haverinen et al.
10,430,784 B1  10/2019  He et al.
(Continued)

FOREIGN PATENT DOCUMENTS

CN  107706548 A  2/2018
EP  3091606 A1  11/2016
(Continued)

OTHER PUBLICATIONS

Search Strategy from Dialog, STIC, ProQuest, Aug. 27, 2022, 5 pages.
(Continued)

*Primary Examiner* — Edwyn Labaze
(74) *Attorney, Agent, or Firm* — Polsinelli P.C.

(57) ABSTRACT

A wearable device, such as a finger ring worn by a user, communicates information about a user to a reader that uses the information in order to perform a transaction. Such wearable device may be conveniently carried by and accessible to the user such that utilization of the device for the transaction is less burdensome for the user, thereby encouraging use of the device for particular transactions. Indeed, in some cases, such as when the device is implemented as a finger ring or other type of jewelry, the user may be encouraged to carry the device in an exposed manner such that it is readily available for the transaction without the user having to search in a wallet, pocket, or purse for the device.

20 Claims, 17 Drawing Sheets

Related U.S. Application Data continuation of application No. 17/219,570, filed on Mar. 31, 2021, now Pat. No. 11,328,283.

(60) Provisional application No. 63/052,937, filed on Jul. 16, 2020.

(51) Int. Cl.
| | | |
|---|---|---|
| *G06K 19/07* | (2006.01) | |
| *G06K 19/077* | (2006.01) | |
| *G06Q 20/20* | (2012.01) | |
| *G06Q 20/40* | (2012.01) | |
| *H01Q 1/27* | (2006.01) | |

(52) U.S. Cl.
CPC ..... *G06K 19/0709* (2013.01); *G06K 19/0712* (2013.01); *G06K 19/0726* (2013.01); *G06K 19/07762* (2013.01); *G06K 19/07779* (2013.01); *G06Q 20/401* (2013.01); *G06Q 20/409* (2013.01); *H01Q 1/273* (2013.01); *G06Q 20/204* (2013.01); *G06Q 20/3278* (2013.01)

(58) Field of Classification Search
CPC ........... G06K 19/0712; G06K 19/0726; G06K 19/07762; G06K 19/07779; H01Q 1/273
USPC ................ 705/41, 69–76; 235/380, 487, 375
See application file for complete search history.

(56) References Cited

U.S. PATENT DOCUMENTS

| | | | |
|---|---|---|---|
| 10,635,173 | B2 | 4/2020 | Lim et al. |
| 11,328,283 | B2 | 5/2022 | Rezayee et al. |
| 11,715,085 | B2 | 8/2023 | Rezayee et al. |
| 11,763,285 | B2 | 9/2023 | Rezayee et al. |
| 11,783,312 | B2 | 10/2023 | Rezayee et al. |
| 2007/0013483 | A1 | 1/2007 | Stewart |
| 2008/0238667 | A1* | 10/2008 | Olson ................ G08B 13/2417 340/541 |
| 2012/0026009 | A1 | 2/2012 | Zhao et al. |
| 2012/0218184 | A1 | 8/2012 | Wissmar |
| 2012/0229361 | A1 | 9/2012 | Goins et al. |
| 2014/0073071 | A1 | 3/2014 | Diorio et al. |
| 2014/0246924 | A1 | 9/2014 | Proud |
| 2014/0266624 | A1 | 9/2014 | Van Bosch et al. |
| 2015/0312704 | A1 | 10/2015 | Tärnhed et al. |
| 2016/0020832 | A1 | 1/2016 | Ting |
| 2016/0156603 | A1 | 6/2016 | Janik |
| 2016/0171201 | A1 | 6/2016 | Schröder |
| 2016/0189134 | A1 | 6/2016 | Voege et al. |
| 2016/0253651 | A1* | 9/2016 | Park ........................ G06Q 20/34 705/39 |
| 2016/0269070 | A1 | 9/2016 | Oliaei |
| 2016/0350581 | A1 | 12/2016 | Manuel et al. |
| 2017/0006414 | A1 | 1/2017 | Tomassini |
| 2017/0124393 | A1* | 5/2017 | Kim ................ G06F 21/32 |
| 2017/0222692 | A1 | 8/2017 | Huang et al. |
| 2017/0277990 | A1 | 9/2017 | Tokunaga et al. |
| 2018/0248586 | A1 | 8/2018 | Pachler et al. |
| 2019/0080220 | A1 | 3/2019 | Dandamudi |
| 2019/0190128 | A1 | 6/2019 | Shaker |
| 2019/0236251 | A1* | 8/2019 | Yang ..................... H04W 12/06 |
| 2019/0325365 | A1* | 10/2019 | Shannon ............... H04W 4/029 |
| 2019/0355191 | A1* | 11/2019 | Jones ....................... H04B 5/77 |
| 2019/0387848 | A1 | 12/2019 | Leybourn |
| 2020/0233452 | A1 | 7/2020 | Von Badinsiki et al. |
| 2021/0067203 | A1 | 3/2021 | Hoelzl et al. |
| 2021/0089126 | A1 | 3/2021 | Nickerson |
| 2021/0097520 | A1 | 4/2021 | Adari |
| 2021/0258783 | A1* | 8/2021 | Wheeler ................. H04W 4/38 |
| 2021/0357908 | A1 | 11/2021 | Huynh |
| 2024/0070409 | A1* | 2/2024 | Ershov ............ G06K 19/07762 |

FOREIGN PATENT DOCUMENTS

| | | | | |
|---|---|---|---|---|
| KR | 20070061348 | A | * 6/2007 | ....... G06K 19/07762 |
| KR | 20200023321 | A | 3/2020 | |
| KR | 102078104 | B1 | 4/2020 | |
| WO | 2016/111897 | A1 | 7/2016 | |
| WO | 2018/020055 | A1 | 2/2018 | |
| WO | 2018/118676 | A1 | 6/2018 | |
| WO | WO-2020093612 | A1 | * 5/2020 | |
| WO | 2020/114076 | A1 | 6/2020 | |
| WO | WO-2020201853 | A1 | * 10/2020 | ............... H04B 5/72 |
| WO | 2022/016104 | A1 | 1/2022 | |

OTHER PUBLICATIONS

EIC 3600 Search Report, STIC, ProQuest, Completed on Feb. 13, 2023, 4 pages.

* cited by examiner

SYSTEMS AND METHODS FOR PERFORMING TRANSACTIONS

CROSS REFERENCE TO RELATED APPLICATION

This application is a continuation of U.S. patent application Ser. No. 17/714,016, entitled "Systems and Methods for Performing Payment Transactions" filed on Apr. 5, 2022 and granted as U.S. Pat. No. 11,783,312, which is incorporated herein by reference. U.S. patent application Ser. No. 17/714,016 is a continuation of U.S. patent application Ser. No. 17/219,570, entitled "Systems and Methods for Performing Payment Transactions" filed on Mar. 31, 2021 and granted as U.S. Pat. No. 11,328,283, which is incorporated herein by reference. U.S. patent application Ser. No. 17/219,570 claims priority to U.S. Provisional Patent Application No. 63/052,937, entitled "Systems and Methods for Performing Payment Transactions" and filed on Jul. 16, 2020, which is incorporated herein by reference.

BACKGROUND

Near field communication (NFC) devices are increasingly used in a variety of applications to communicate data. In NFC communication, a first NFC device is positioned sufficiently close (e.g., a few inches or less) to another NFC device, such as an NFC reader, so that the devices are inductively coupled. Load modulation is often used to communicate data. In this regard, the reader may transmit a wireless carrier signal, and the NFC device may change the impedance of its antenna circuit in order to modulate the carrier signal with data. Such load modulation may be passive where the NFC device absorbs energy from the carrier signal or active where the NFC actively transmits energy at the same frequency as the carrier signal. The reader detects and demodulates the modulated signal in order to recover the data.

NFC devices have been frequently used in financial payment transactions for effectuating a payment between a consumer and a merchant. In such application, a payment device, such as a credit card, debit card, cash card, or a smartphone, has an NFC device that communicates payment data to a payment reader of a merchant for completing a payment transaction. Such payment data may include information, such as an account number, that is used by the payment reader to generate a request for payment. The payment reader transmits such payment request to a payment server for approval of a payment from the consumer account identified by the payment data to the merchant.

Since the payment data often includes sensitive information necessary for approval of financial payments, it is generally desirable for communication of the payment data to be secure and reliable. It is also desirable that the process for requesting payment, including the reading of payment data and initiation of the payment transaction, to be efficient and quick so as to reduce burdens on the consumer and encourage the consumer to use the payment device for the payment transaction.

BRIEF DESCRIPTION OF THE DRAWINGS

The above and other features of the present disclosure, its nature and various advantages will be more apparent upon consideration of the following detailed description, taken in conjunction with the accompanying drawings in which:

FIG. 14b depicts an illustrative side view of the metallic shell depicted by FIG. 14a.

DETAILED DESCRIPTION

The present disclosure generally pertains to systems and methods for performing financial payment transactions. In some embodiments of the present disclosure, a wearable payment device, such as a finger ring worn by a user, communicates payment data to a payment reader that uses the payment data in order to request a payment transaction. Such wearable payment device may be conveniently carried by and accessible to the user such that utilization of the payment device for the payment transaction is less burdensome for the user, thereby encouraging use of the payment device for payments. Indeed, in some cases, such as when the payment device is implemented as a finger ring or other type of jewelry, the user may be encouraged to carry the payment device in an exposed manner such that it is readily available for the payment transaction without the user having to search in a wallet, pocket, or purse.

Figure 1:
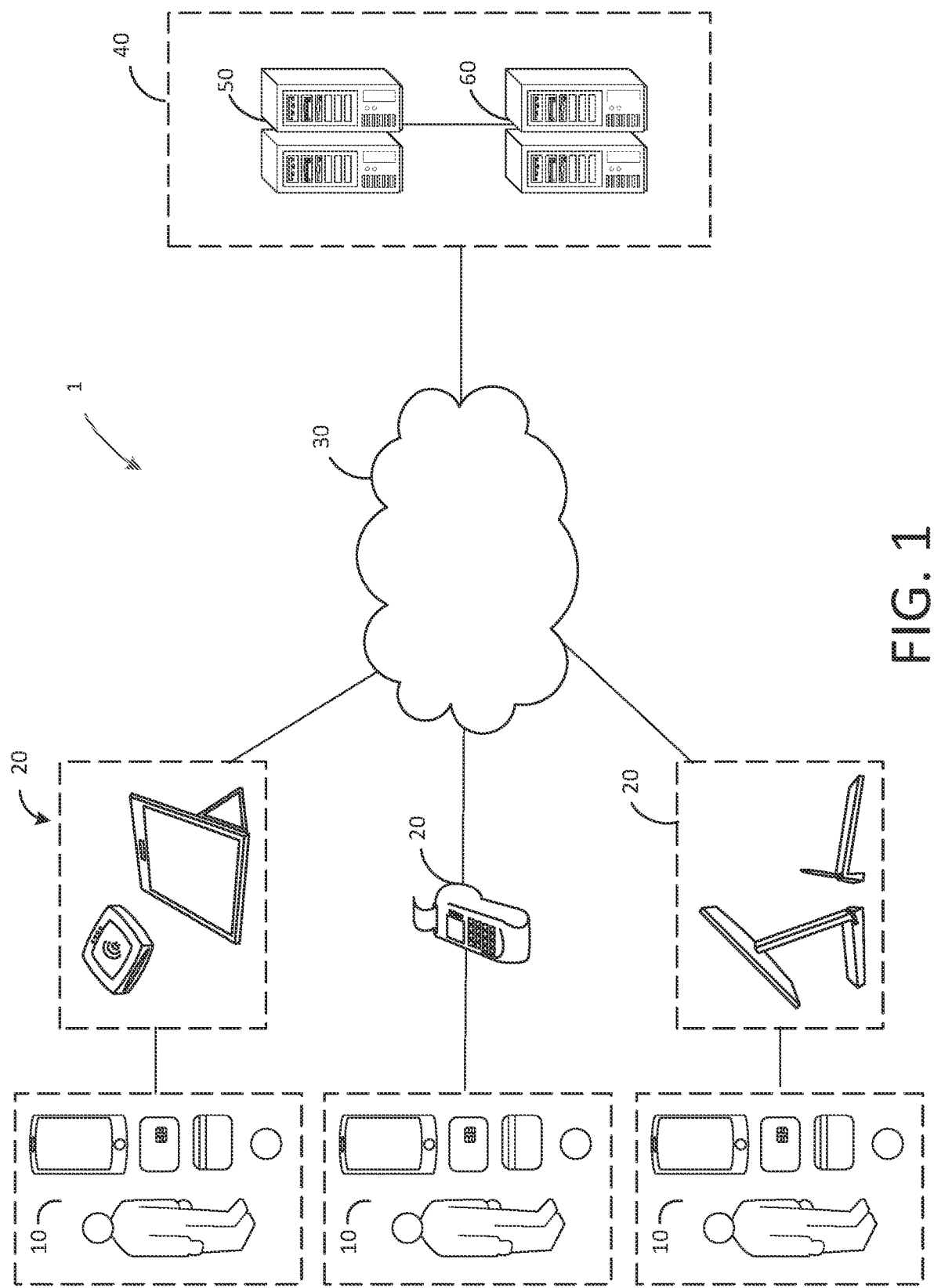
FIG. 1 depicts an illustrative block diagram of a payment system in accordance with some embodiments of the present disclosure.

FIG. 1 depicts an illustrative block diagram of a payment system 1 that utilizes NFC communication in accordance with some embodiments of the present disclosure. In one embodiment, the payment system 1 includes a payment device 10, payment terminal 20, network 30, and payment server 40. In an exemplary embodiment, payment server 40 may include a plurality of servers operated by different entities, such as a payment service system 50 and a bank server 60. These components of payment system 1 facilitate electronic payment transactions between a merchant and a customer.

The electronic interactions between the merchant and the customer take place between the customer's payment device 10 and the merchant's payment terminal 20. The customer has a payment device 10, such as a credit card having a magnetic stripe, a credit card having an externally-driven processing device such as an EMV chip, or an NFC-enabled electronic device, such as a smartphone running a payment application or a wearable electronic device (e.g., a finger ring or other item of jewelry). Other types of payment devices 10, such as wearable payment devices, are possible as will be described in more detail below. The merchant has a payment terminal 20 such as a merchant device, payment reader, standalone terminal, combined customer/merchant terminals, electronic device (e.g., smartphone) running a point-of-sale application, or other electronic device that is capable of processing payment information (e.g., encrypted payment data and user authentication data) and transaction information (e.g., purchase amount and point-of-purchase information).

In some embodiments (e.g., for low-value transactions or for payment transactions that are less than a payment limit indicated by the payment device 10), the initial processing and approval of the payment transaction may be processed at payment terminal 20. In other embodiments, payment terminal 20 may communicate with payment server 40 over network 30. Although payment server 40 may be operated by a single entity, in one embodiment payment server 40 may include any suitable number of servers operated by any suitable entities, such as a payment service system 50 and one or more banks of the merchant and customer (e.g., a bank server 60). The payment terminal and the payment server 40 communicate payment and transaction information to determine whether the transaction is authorized. For example, payment terminal 20 may provide encrypted payment data, user authentication data, purchase amount information, and point-of-purchase information to payment server 40 over network 30. Payment server 40 may determine whether the transaction is authorized based on this received information as well as information relating to customer or merchant accounts, and respond to payment terminal 20 over network 30 to indicate whether or not the payment transaction is authorized. Payment server 40 may also transmit additional information such as transaction identifiers to payment terminal 20.

Based on the information that is received at payment terminal 20 from payment server 40, the merchant may indicate to the customer whether the transaction has been approved. In some embodiments, approval may be indicated at the payment terminal, for example, at a display device of a payment terminal. In other embodiments such as a smartphone or a wearable payment device, information about the approved transaction and additional information (e.g., receipts, special offers, coupons, or loyalty program information) may be provided to the NFC payment device for display at a screen of the smartphone or wearable payment device (e.g., a watch having an electronic display for displaying time and other information) or storage in memory.

Figure 2:
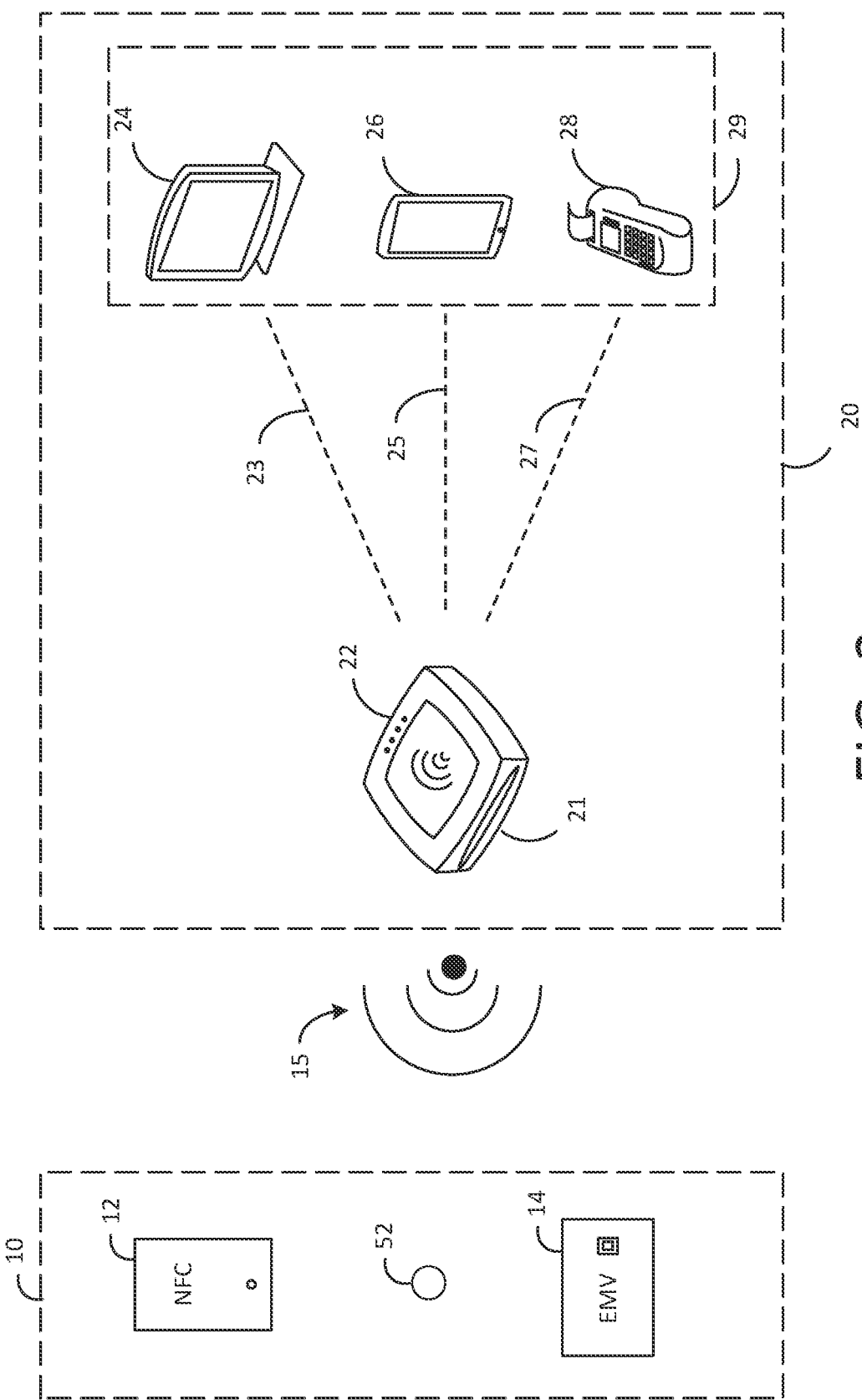
FIG. 2 depicts an illustrative block diagram of a payment device and payment terminal in accordance with some embodiments of the present disclosure.

FIG. 2 depicts an illustrative block diagram of payment device 10 and payment terminal 20 in accordance with some embodiments of the present disclosure. Although it will be understood that payment device 10 and payment terminal 20 of payment system 1 may be implemented in any suitable manner, in one embodiment the payment terminal 20 may comprise a payment reader 22 and a merchant device 29 (either or which may be an NFC device as will be described in more detail below). However, it will be understood that as used herein, the term payment terminal may refer to any suitable component of the payment terminal, such as payment reader 22. In an embodiment, the payment reader 22 of payment terminal 20 may be a device that facilitates transactions between the payment device 10 and a merchant device 29 running a point-of-sale application.

In one embodiment, payment device 10 may be a device that is capable of communicating with payment terminal 20 (e.g., via payment reader 22), such as an NFC device 12 or an EMV chip card 14 (which also may be an NFC device capable of communicating with the payment reader 22 via NFC). Chip card 14 may include a secure integrated circuit that is capable of communicating with a payment terminal such as payment terminal 20, generating encrypted payment information, and providing the encrypted payment information as well as other payment or transaction information (e.g., transaction limits for payments that are processed locally) in accordance with one or more electronic payment standards such as those promulgated by EMVCo. In some embodiments, chip card 14 may include an EMV chip that is an externally-driven processing device that receives signals necessary to operate the EMV chip (e.g., power, ground, and clock signals) from an external source. Chip card 14 may include contact pins for communicating with payment reader 22 (e.g., in accordance with ISO 7816) and in some embodiments, may be inductively coupled to payment reader 22 via a near field 15. A chip card 14 that is inductively coupled to payment reader 22 may communicate with payment reader 22 using load modulation of a wireless carrier signal that is provided by payment reader 22 in accordance with a wireless communication standard such as ISO 14443. When the payment device 10 is implemented as a wearable payment device, it may similarly include an EMV chip or other type of electronics for communicating payment data, as described in more detail herein.

NFC device 12 may be an electronic device such as a smartphone or tablet. NFC device may be wearable electronic device, such as a smartwatch or other item of jewelry (e.g., a finger ring 52) that is capable of engaging in secure transactions with payment terminal 20 (e.g., via communications with payment reader 22). NFC device 12 may have hardware (e.g., a secure element including hardware and executable code) and/or software (e.g., executable code operating on at least one processor in accordance with a host card emulation routine) for performing secure transaction functions. During a payment transaction, NFC device 12 may be inductively coupled to payment reader 22 via near field 15 and may communicate with payment terminal 20 by active or passive load modulation of a wireless carrier signal provided by payment reader 22 in accordance with one or more wireless communication standards such as ISO 14443 and ISO 18092.

Although payment terminal 20 may be implemented in any suitable manner, in one embodiment payment terminal 20 may include a payment reader 22 and a merchant device 29. The merchant device 29 runs a point-of-sale application that provides a user interface for the merchant and facilitates communication with the payment reader 22 and the payment server 40. Payment reader 22 may facilitate communications between payment device 10 and merchant device 29. As described herein, a payment device 10 such as NFC device 12 or chip card 14 may communicate with payment reader 22 via inductive coupling. This is depicted in FIG. 2 as near field 15, which comprises a wireless carrier signal having a suitable frequency (e.g., 13.56 MHz) emitted from payment reader 22.

In one embodiment, payment device 10 may be a contactless payment device such as NFC device 12 or chip card 14, and payment reader 22 and the contactless payment device 10 may communicate by modulating the wireless carrier signal within near field 15. In order to communicate information to payment device 10, payment reader 22 changes the amplitude and/or phase of the wireless carrier signal based on data to be transmitted from payment reader 22, resulting in a wireless data signal that is transmitted to the payment device. This signal is transmitted by an antenna of payment reader 22 that is tuned to transmit at 13.56 MHz, and if the payment device 10 also has a suitably tuned antenna within the range of the near field 15 (e.g., 0 to 10 cm), the payment device receives the wireless carrier signal or wireless data signal that is transmitted by payment reader 22. In the case of a wireless data signal, processing circuitry of the payment device 10 is able to demodulate the received signal and process the data that is received from payment reader 22.

When a contactless payment device 10 is within the range of the near field it is inductively coupled to the payment reader 22. Thus, the payment device 10 is also capable of modulating the wireless carrier signal via active or passive load modulation. By changing the tuning characteristics of the antenna of payment device 10 (e.g. by selectively switching a parallel load into the antenna circuit based on modulated data to be transmitted) the wireless carrier signal is modified at both the payment device and payment reader 22, resulting in a modulated wireless carrier signal. In this manner, the payment device 10 is capable of sending modulated data to payment reader 22.

Figure 3:
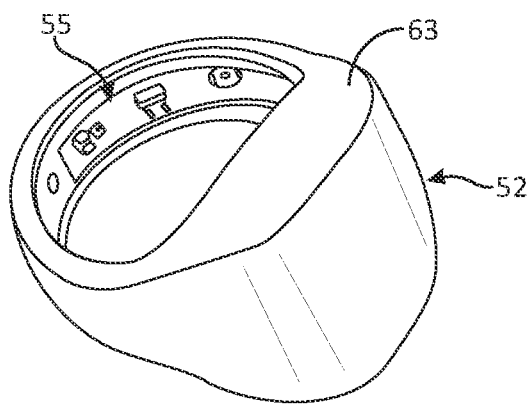
FIG. 3 depicts a ring that may be used to implement a payment device in accordance with some embodiments of the present disclosure.

As described, the payment device 10 in some embodiments may be wearable, such as jewelry or devices that may be attached to or embedded in clothing. FIG. 3 depicts an exemplary embodiment of a finger ring 52 that may be used as a payment device 10. The use of a finger ring 52 to be worn on a finger of a user is exemplary, and it should be emphasized that the concepts described hereafter for the ring 52 may be applicable to other types of payment devices 10, including in particular non-wearable payment devices, such as chip cards, and other types of wearable payment devices, such as other types of jewelry or devices that may be attached to clothing. As an example, similar configurations and techniques may be used for other types of jewelry, including but not limited to other types of jewelry that form rings (e.g., bracelets and wrist watches).

Figure 4:
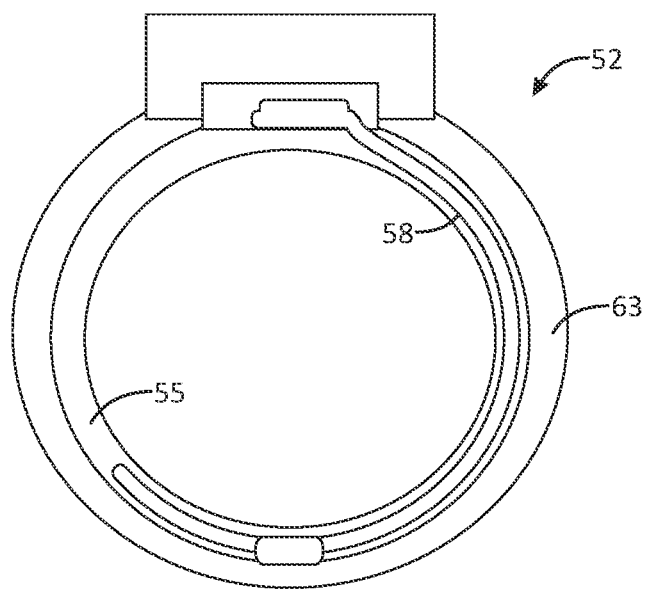
FIG. 4 depicts an illustrative side view of a ring, such as is depicted by FIG. 3.

As will be described in more detail hereafter, the ring 52 has various circuitry and sensors for performing various actions and monitoring various events as will be described in more detail below. In this regard, referring to FIG. 4, the ring 52 comprises a mold 55 having at least one cavity into which an electrical system 58 is inserted. In some embodiments, the electrical system 58 comprises a flex printed circuit board ("flex PCB) (not specifically shown) on which various electrical components (e.g., circuitry and sensors) are positioned. The cavity of the mold 55 may be sealed during manufacturing so that the mold 55 is waterproof, thereby preventing water from reaching electrical components that could be shorted or otherwise damaged by water. Further, the mold 55 may be composed of an insulating material, such as plastic, and the mold 55 may be coupled to a shell 63 that extends along an exterior surface of the mold 55.

The mold 55 and shell 63 form an inner ring and outer ring, respectively, where the shell 63 surrounds and protects the mold 55 that is positioned within the shell 63. In some embodiments, the shell 63 is composed of a metallic material, such as gold, silver, or platinum, though other types of materials for the shell 63 are possible in other embodiments. When the shell 63 is composed of an electrically conductive material, the shell may 63 form part of the electrical circuitry of the ring 52. As an example, as will be described in more detail below, the shell 63 may be used as an antenna for wirelessly transmitting or receiving signals. Illustrative configurations of rings having embedded electronics and illustrative methods for making such rings are described in U.S. Pat. No. 9,861,314, entitled "Wearable Electronic Device and Method for Manufacturing Thereof" and issued on Jan. 9, 2018, which is incorporated herein by reference.

Figure 5:
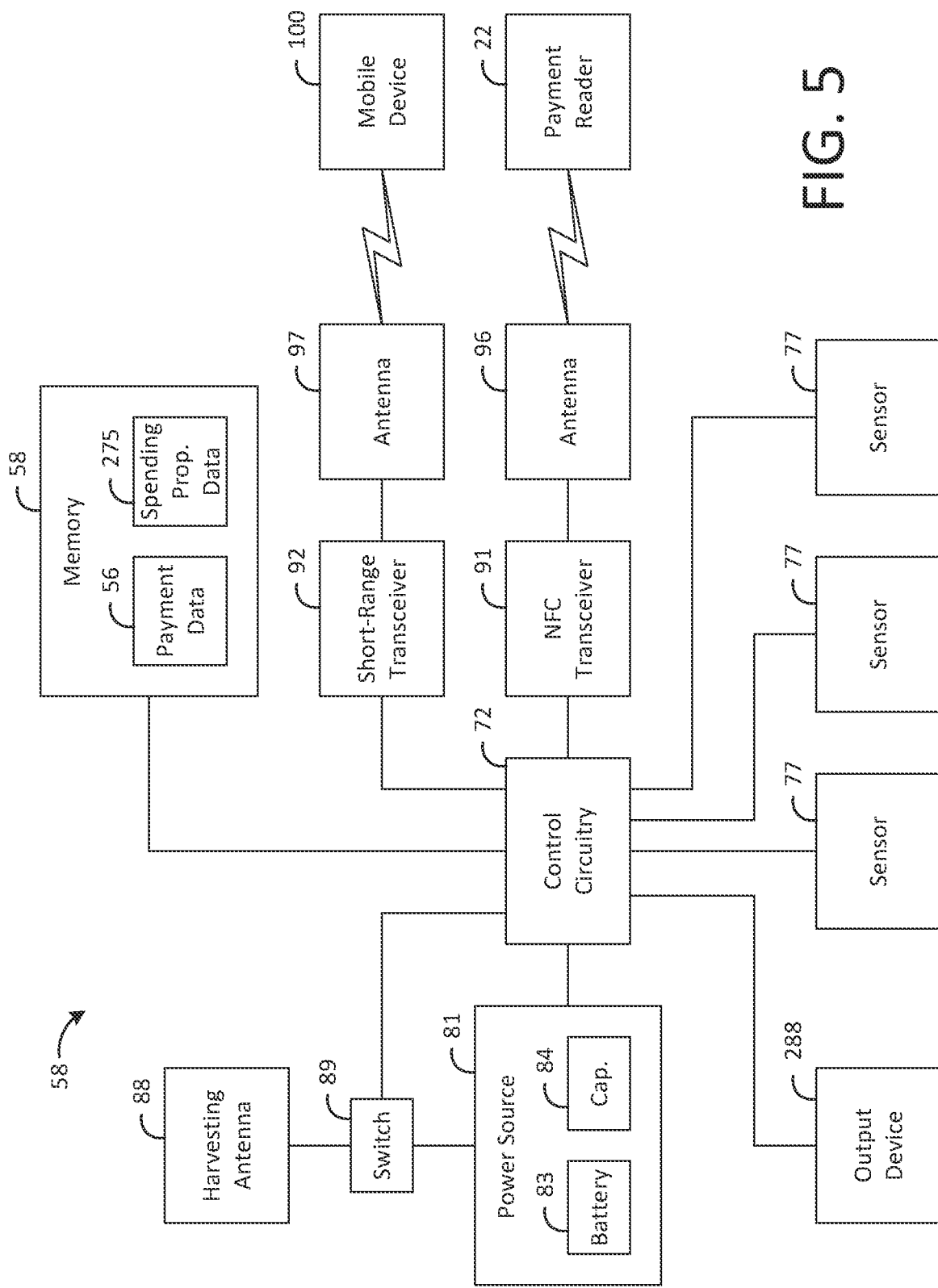
FIG. 5 depicts an illustrative block diagram of an electrical system, such as is depicted by FIG. 4.

FIG. 5 depicts an exemplary embodiment of the electrical system 58. As shown by FIG. 5, the electrical system 58 may comprise control circuitry 72 for generally controlling the operation of the system 58, as will be described in more detail below. The control circuitry 72 may be implemented in hardware or any combination of hardware, software, and firmware. As an example, the control circuitry 72 may comprise one or more processors for executing software and/or firmware for performing functions of the ring 52 described herein. The control circuitry 72 may also include hardware components, such as field-programmable gate arrays (FPGAs) or application-specific integrated circuits (ASICs), for performing any of the described functions.

As shown by FIG. 5, the system 58 may have one or more sensors 77 for sensing various types of parameters or events. The exemplary embodiment of FIG. 5 shows three sensors 77 for simplicity of illustration, but the system 58 may have any number of sensors 77 in other embodiments. As a mere example, the sensors 77 may include one or more temperature sensors for sensing the temperature of an object, such as the user, a component of the ring 52, or ambient air. The sensors 77 may include one or more accelerometers and/or gyroscopes for sensing movement of the ring 52. One or more of the sensors 77 may also be configured to sense various physiological parameters of the user, such as the user's pulse. Other types of sensors are also possible.

As further shown by FIG. 5, the system 58 may include a power source 81 for providing electrical power to other components of the system 58. As an example, the power source 81 may comprise at least one battery 83 and/or at least one capacitor 84 for storing electrical charge. In some embodiments, the battery 83 may be rechargeable. Further, the system 58 may have a harvesting antenna 88 (e.g., a coil) for harvesting energy from the environment, such as from a magnetic field generated by a reader or other device, and providing the harvested energy to the power source 81 for replenishing energy in the battery 83 and/or capacitor 84. As shown by FIG. 5, the harvesting antenna 88 may be coupled to the power source 81 through a switch 89 controlled by the control circuitry 72.

The system 58 may also comprise a plurality of transceivers 91-92 and antennas 96-97 for enabling wireless communication with devices external to the ring 52. The system 58 shows two transceivers 91-92 and two antennas 96-97 for simplicity of illustration, but the system 58 may have any number of transceivers and any number of antennas in other embodiments. In one embodiment, the transceiver 91 and antenna 96 are configured to communicate wireless signals in one frequency range, and the transceiver 92 and antenna 97 are configured to communicate wireless signals in another frequency range. As an example, in one embodiment, the transceiver 91 is configured to communicate NFC signals via antenna 96 and, for illustrative purposes, will be referred to hereafter as "NFC transceiver." In some embodiments, the frequency of such wireless signal is centered at about 13.56 Mega-Hertz (MHz). However, the transceiver 91 may be used to communicate other types of signals and NFC signals at different frequencies in other embodiments. In one embodiment, the transceiver 92 is configured to communicate Bluetooth signals (or signals in accordance with another short-range protocol) via antenna 97 and, for illustrative purposes, will be referred to hereafter as "short-range transceiver." In some embodiments, the frequency of such wireless signal is centered at in a range from about 2.402 Giga-Hertz (GHz) to about 2.480 GHZ. However, the transceiver 92 may be used to communicate other types of signals and signals at other frequencies in other embodiments. FIG. 5 shows the transceivers 91-92 using different antennas 96-97, but in some embodiments, the transceivers 91-92 may be configured to use the same antenna, if desired.

In some embodiments, the short-range transceiver 92 is configured to communicate wirelessly with a mobile device 100, such as a smartphone, that is typically carried by the user. Such mobile device 100 may provide a convenient way for a user to interact with the ring 52. In this regard, a payment application or other type of application on the mobile device 100 may display a graphical user interface (GUI) through which a user may interact with the ring 52. In this regard, such GUI may display information received from the short-range transceiver 92 and receive inputs from the user to be transmitted to the ring 52 via short-range transceiver 92. In other embodiments, the short-range transceiver 92 may communicate with other types of devices.

The short-range transceiver 92 may be used to communicate information, such as data sensed by the sensors 77, with an external device (e.g., the mobile device 100). As a mere example, the sensors 77 may monitor physiological parameters of the user and transmit such parameters to the mobile device 100, which may track and display various health parameters or statistics based on the information from the ring 52.

The NFC transceiver 91 and antenna 96 may be used to wirelessly communicate with the payment reader 22, such as transmitting payment data for a payment transaction. In this regard, the ring 52 may store the payment data 56 in memory 58. When the ring 52 is positioned sufficiently close to the payment reader 22 to be within the magnetic field generated by the reader 22, the NFC transceiver 91 may use active or passive load modulation to communicate the payment data 56 to the payment reader 22.

During the transaction, the mobile device 100 may be used to interface with the user. As an example, if the payment transaction requires the user to enter a valid personal identification number (PIN), the control circuitry 72 may be configured to transmit a prompt for the user's PIN to the mobile device 100 via the short-range transceiver 92 and antenna 97. The user may enter his or her PIN to the mobile device 100, which then transmits such PIN to the ring 52. The short-range transceiver 92 may receive the PIN, and the control circuitry 72 may include the PIN as part of the payment data 56 transmitted to the payment reader 22 via the NFC transceiver 91 and antenna 96.

In another example, the user may be requested to approve the payment request. As an example, the payment reader 22 may transmit details of the payment transaction, such as the amount of payment to be requested. This information may be received by the NFC transceiver 91 and transmitted to the mobile device 100 by the short-range transceiver 92. The mobile device 100 may display the information to the user and prompt the user to confirm that the request for payment in the amount indicated is approved. Upon receiving such confirmation by the user, the mobile device 100 may transmit an approval of the payment request to the short-range transceiver 92. Upon receiving such approval, the control circuitry 72 may transmit the payment data 56 to the payment reader 22 in order to initiate the payment transaction. Various other types of information regarding the payment transaction may be communicated by the ring 52 in other embodiments.

In some embodiments, use of the mobile device 100 for payment transactions is unnecessary, and it is possible to use the ring 52 in other ways during a payment transaction. As an example, it is possible for the ring 52 to communicate payment data 56 with the payment reader 22 during a payment transaction without communicating with the mobile device 100. Information about the payment transaction received from the payment reader 22, such as whether the payment transaction is approved or the amount of the payment, may be stored in the ring 52 and accessed at a later time by the mobile device 100 or other device. In some embodiments, payment data 56 to be communicated to the payment reader 22, such as an account number or other identifier of a financial account to be used for the payment and information related to such account (e.g., a PIN or other authentication information) may be stored in the mobile device 100 and accessed by the ring 52 during or prior to the payment transaction. As an example, when the ring 52 is placed within the magnetic field of the payment reader 22, the control circuitry 72 in response to detection of the magnetic field may communicate with the mobile device 100 via the short-range transceiver 92 to retrieve the stored payment data 56 and then communicate the payment data 56 to the payment reader 22 via the NFC transceiver 91. In yet other embodiments, other interactions between the ring 52 and the mobile device 100 are possible.

In some embodiments, the antennas 88, 96, 97 may be positioned within the within the mold 55 such that the shell 63 extends around the antennas 88, 96, 97 and affects their communication performance. As an example, when the mold 55 is positioned within the shell 63 during manufacturing, the presence of the shell 66 may slightly change the impedance of the antennas 88, 96, 97. Further, the impedances of the antennas 88, 96, 97 may be affected by various other factors, such as temperature and whether a finger or other object passes through the ring 52. As an example, the impedance of an antenna 88, 96, 97 may slightly change when a user puts on or takes off the ring 52. The control circuitry 72 may be configured to tune any of the antennas 88, 96, 97 after manufacturing in an effort to account for these impedance fluctuations. Such tuning may occur periodically or at various times as may be desired, such as when a change or event occurs (e.g., a user putting on or taking off the ring 52). The tuning may also be triggered by the detection of a magnetic field of a payment reader 22. As an example, when the magnetic field is detected, the NFC antenna 96 may be tuned prior to communication with the payment reader 22 in an effort to improve the quality of communication between the ring 52 and the payment reader 22 during the payment transaction. Tuning of an antenna 88, 96, 97 may be performed at various other times as may be desired.

Figure 6:
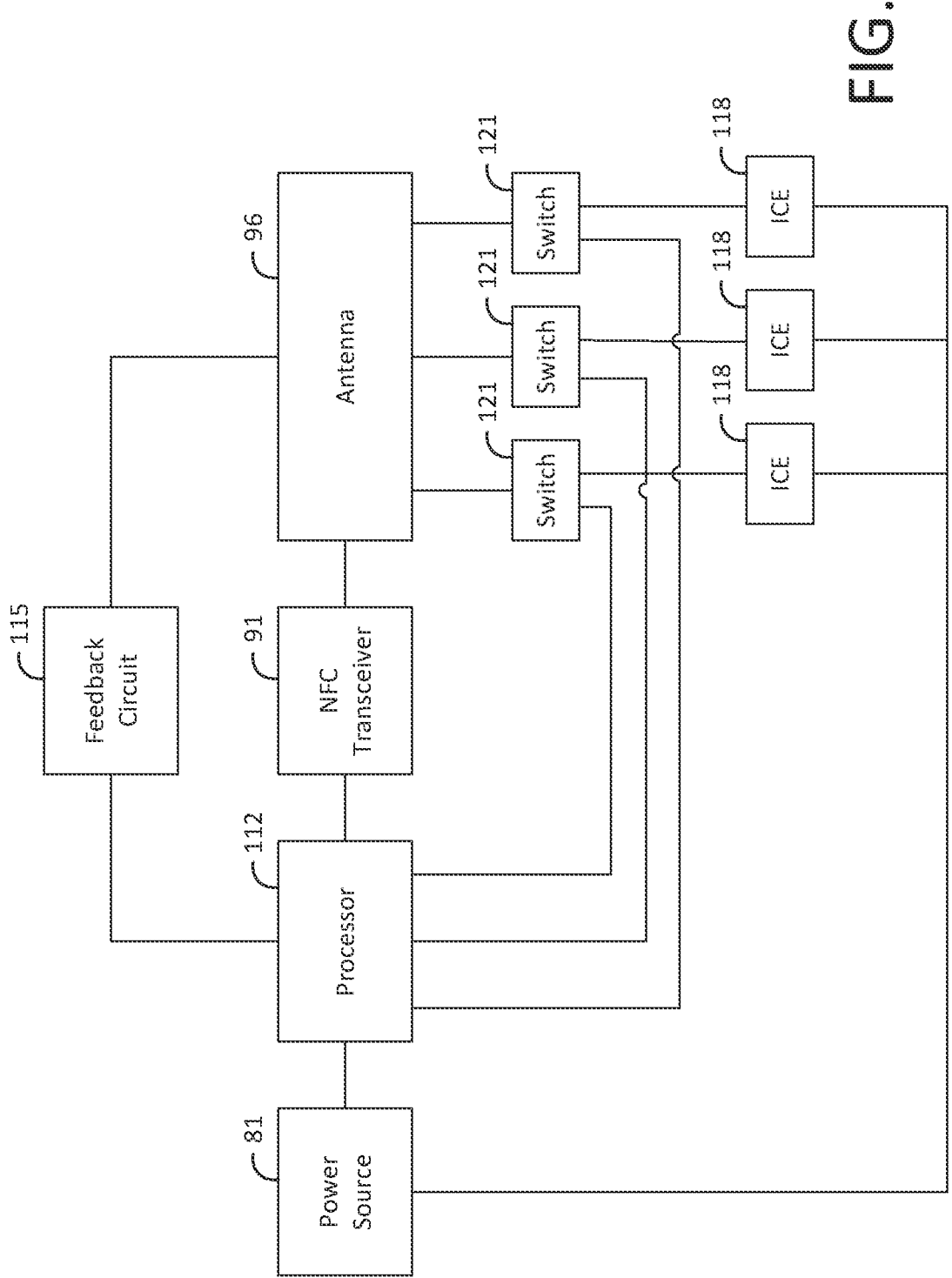
FIG. 6 depicts an illustrative block diagram of circuitry for tuning an antenna of a payment device, such as is depicted by FIG. 5.

FIG. 6 depicts an embodiment of circuitry for tuning the NFC antenna 96. In the embodiment shown by FIG. 6, the control circuitry 72 comprises at least one processor 112, a feedback circuit 115, a plurality impedance control elements (ICEs) 118, and a plurality of switches 121, such as field effect transistors (FETs). The feedback circuit 115 is configured to measure one or more characteristics (e.g., impedance, voltage, current, or phase difference) of the NFC antenna 96 indicative of its performance and to provide information indicative of the measured characteristic to the processor 112, which uses this information to tune the antenna 96 as will be described in more detail below. As an example, the feedback circuit 115 may have a sensor (not specifically shown) for measuring a voltage of the antenna 96 and a sensor (not specifically shown) for measuring a current consumed by the antenna 96. For example, if the ring 52 is configured to communicate with a payment reader 22 via passive load modulation, the feedback circuit 115 may be configured to take a measurement when the magnetic field of the payment reader 22 is sensed. The feedback circuit 115 may provide the measured voltage and/or current to the processor 112. Alternatively, the feedback circuit 115 may calculate a value (e.g., the impedance of the antenna 96) using the measured voltage and current, and send the calculated value to the processor 112. In yet other embodiments, the feedback circuit 115 may measure the phase difference between the voltage and current of the antenna 96, and the processor 112 may be configured to adjust the impedance of the antenna 96 in an effort to minimize this phase difference. Yet other parameters measured by the feedback circuit 115 and different techniques for determining how to adjust the impedance of the antenna 96 are possible.

To enable tuning of the NFC antenna 96, a plurality of impedance control elements 118 are coupled to the antenna 96. Specifically, each impedance control element 118 is coupled to the NFC antenna 96 at a respective point on the antenna, referred to as a "tap." Each impedance control element 118 is configured to affect the overall impedance and, thus, performance of the antenna 96 based on whether it is electrically coupled to the antenna 96. As an example, each impedance control element 118 may be one or more capacitors or inductors that are selectively coupled to the antenna 96 based on the states of switches 121. In this regard, the power source 81 is coupled to each impedance control element 118 through a respective switch 121. Further, for each impedance control element 118 to be electrically coupled to the antenna 96, the processor 112 is configured to transition the element's switch 121 to a closed state to allow current to flow through the switch 121. Based on the feedback from the feedback circuit 115, the processor 112 is configured to determine how the impedance of the antenna 96 should be adjusted in order to tune the antenna 96 to a desired impedance. The processor 112 is configured then to control the states of the switches 121 such that impedance of the antenna 96 is adjusted closer to the desired value. In this regard, by closing a switch 121 such that current flows through the switch 121, the impedance control element 118 coupled to the switch 121 is energized by the power source 81 such that it provides a capacitance or inductance that changes the impedance of the antenna 96. After adjusting the antenna's impedance, the processor 115 may receive feedback indicative of the antenna's adjusted impedance and determine whether any further adjustments are desired to tune the antenna 96 further.

Note that the use of switches 121 is unnecessary, and other techniques for adjusting the impedance of the antenna 96 are possible. As an example, rather than selectively energizing the impedance control elements 118, the processor 112 may be configured to apply a variable voltage to the impedance control elements 118 in order to change their capacitances or inductances in order to adjust the impedance of the antenna 96 as may be desired. Various other changes to the illustrative configuration shown by FIG. 6 are possible in other embodiments.

In some embodiments, other techniques may be used to tune the antenna 96. For example, rather than tuning the antenna 96 based on characteristics measured when the ring 52 is within the magnetic field of a reader, the control circuitry 72 may be configured to control the NFC transceiver 91 to cause it to actively drive the antenna 96, and while the antenna 96 is being actively driven by the transceiver 92, the performance of the antenna 96 may be assessed to determine whether to adjust its impedance. This technique may be used, for example, if the NFC transceiver 91 is configured to perform active load modulation since the transceiver 91 is designed to drive the antenna 96 in normal operation for such an embodiment. However, this technique can also be used in an embodiment in which the transceiver 92 is configured to communicate with the payment reader 22 using passive load modulation.

Figure 7:
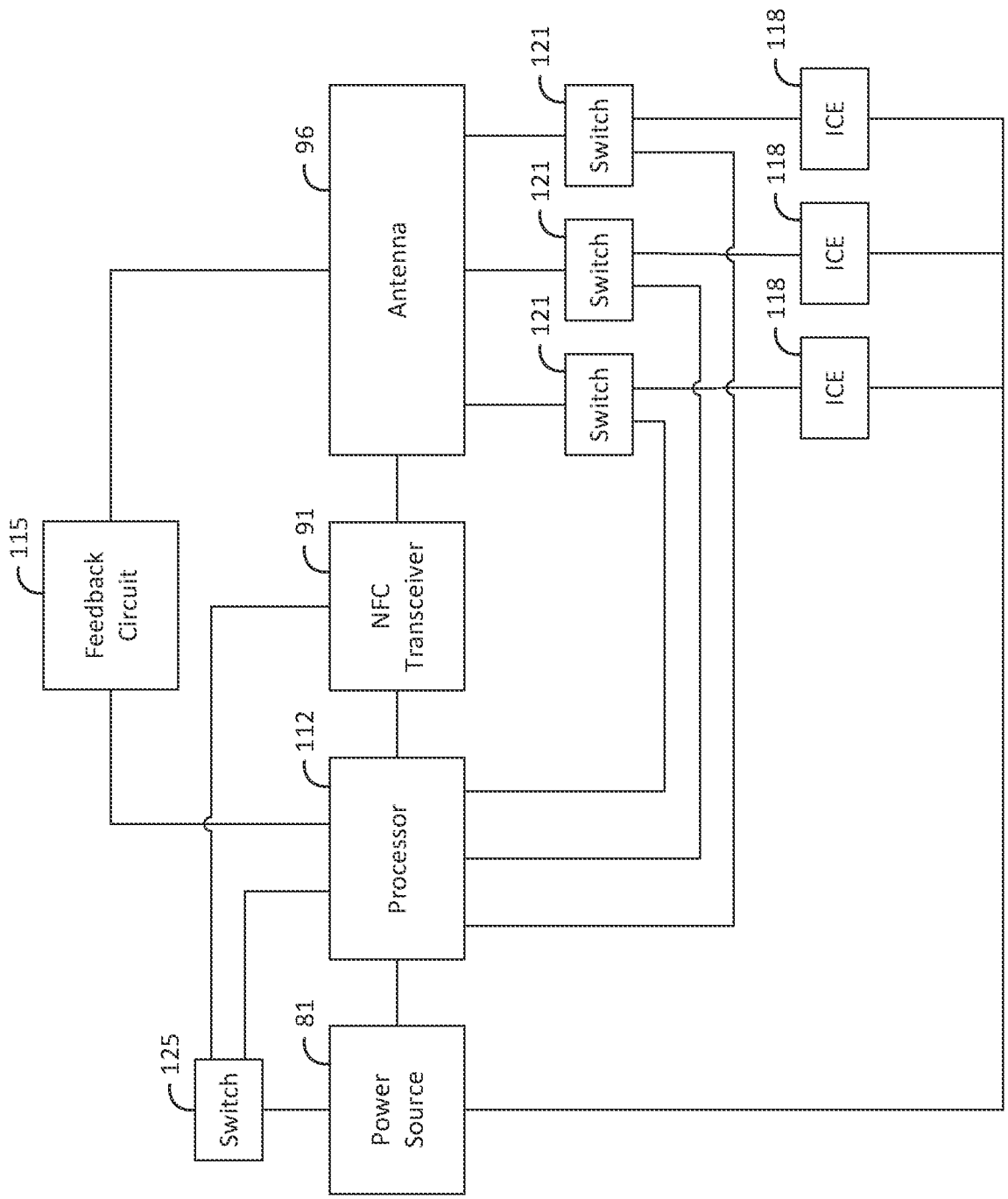
FIG. 7 depicts an illustrative block diagram of circuitry for tuning an antenna of a payment device, such as is depicted by FIG. 5.

FIG. 7 depicts an embodiment in which the NFC transceiver 91 is configured to communicate with the payment reader 22 using passive load modulation, but the antenna 96 is actively driven by the ring 52 for tuning. In this regard, the NFC transceiver 91 is electrically coupled to the power source 81 through a switch 125. When tuning is not being performed, the switch 125 is normally in an open state such that current does not flow through the switch 125, and passive load modulation may be used for communication between the ring 52 and a payment reader 22 using the NFC transceiver 91 and antenna 96. However, when the processor 112 determines that tuning is to be performed, the processor 112 is configured to transition the switch 125 to a closed state such that current flows through the switch 125. The NFC transceiver 91 is configured to use current from the power source 81 to drive the antenna 96 (e.g., wirelessly transmit a signal from the antenna 96). During this time, the feedback circuit 115 is configured to measure at least one characteristic indicative of the antenna's performance, and based on this feedback, the processor 112 may be configured to control energization of the impedance control elements 118 to adjust the impedance of the antenna 96, as described above. Once the antenna 96 has been appropriately tuned, the processor 112 may transition the switch 125 back to the open state such that the NFC transceiver 91 and, thus, antenna 96 are electrically isolated from the power source 81. In such state, the NFC transceiver 91 may be configured to perform passive load modulation when the ring 52 is positioned within the magnetic field of a payment reader 22.

As noted above, there are various techniques that may be used to assess the performance of the antenna 96 and, based on such assessment, determine how to adjust the impedance of the antenna 96. In one embodiment, the processor 112 as part of the tuning process may control the NFC transceiver 91 to sweep across a range of frequencies while actively transmitting. For example, the NFC transceiver 91 may transmit via the antenna 91 at a certain frequency, and the feedback circuit 115 may take a measurement, such as a measure of the frequency response (e.g., voltage and current) of the antenna 96. The NFC transceiver 91 may then adjust (e.g., increase or decrease) the transmitted frequency, and the feedback circuit 115 may take another measurement. This process may be repeated any number of times to take any number of data points (e.g., frequency responses at different frequencies), which collectively define the frequency response of the antenna over a range of frequencies. Based on this frequency response, the processor 112 may be configured to tune the antenna 96. Yet other techniques for tuning the antenna 96 in other embodiments are possible.

Note that similar or the same techniques described herein for tuning the antenna 96 may also be used to tune other antennas of the ring 52, such as the antenna 97 used by the short-range transceiver 92 for wireless communication. As an example, the antenna 97 may be coupled to circuitry similar that shown by FIG. 6 for antenna 96 for adjusting the impedance of the antenna 97. Further, the short-range transceiver 92 may be configured to drive the antenna 97, and measurements of one or more characteristics indicative of the performance of the antenna 97 may be fed back to the processor 112, which may then adjust the impedance of the antenna 97 as described above for the antenna 96. As an example, the processor 112 may adjust the impedance of the antenna 97 and, based on feedback from the mobile device 100, determine when the impedance of the antenna 97 is optimum. For example, the processor 112 may find an impedance state for the antenna 97 that provides a maximum RSSI or a minimum number of errors, as will be described in more detail below. Yet other techniques for using feedback information from the mobile device 100 to assess the performance of and tune the antenna 97 are possible in other embodiments.

Notably, the characteristics measured by the mobile device 100 may be affected by movement of the mobile device 100 and/or ring 52. As an example, if the ring 52 and mobile device 100 are moved further apart, higher errors and lower RSSI can be expected. Thus, while tuning, it may be difficult to determine whether a change in the feedback is attributable to an adjustment of the impedance of the antenna 97 or relative movement of the ring 52 and mobile device 100. In some embodiments, the control circuitry 72 is configured to identify a time period when relative movement of the mobile device 100 and ring 52 is not occurring or is not likely to occur. The control circuitry 72 then performs tuning during such time period.

There are various techniques that can be used to determine when relative movement of the ring 52 and mobile device 100 is not occurring or is not likely to occur. As an example, the processor 112 may monitor one or more sensors 77 for detecting movement of the ring 52, such as accelerometers or gyroscopes, to determine whether movement is occurring. The mobile device 100 similarly may have sensors for sensing movement of the mobile device 100, such as accelerometers and gyroscopes, and the mobile device 100 may report measurements of these sensors to the ring 52. When the processor 112 determines that no or only small movements of the ring 52 and mobile device 100 have occurred for at least a predefined amount of time, such as several minutes or longer, the processor 112 may determine that movement between the ring 52 and the mobile device 100 is unlikely. In response, the processor 112 may initiate a tuning process for tuning the antenna 97 based on communication between the antenna 97 and the mobile device 100. In some embodiments, the processor 112 may determine when the user is sleeping and perform a tuning process while the user is determined to be sleeping. As an example, the processor 112 may determine when the user is sleeping based on physiological characteristics measured by the sensors 77, such as the user's pulse, and initiate tuning of the antenna 97 in response to such determination. In yet other embodiments, other techniques for determining when to tune the antenna 97 are possible.

As noted above, communication between the short-range transceiver 92 and the mobile device 100 or other device may be used to assess the performance of the antenna 97. As an example, the short-range transceiver 92 may be configured to wirelessly transmit a signal to the mobile device 100 via the antenna 97. The mobile device 100 may be configured to measure a parameter indicative of the performance of the antenna 97, such as a quality of the signal transmitted by the antenna 97. For example, the signal may include cyclic redundancy check (CRC) information, and the mobile device may use such information to determine a number of errors in the signal transmitted by the antenna 97. In another example, the mobile device 100 may determine a received signal strength indicator (RSSI) indicative of the signal strength or amplitude of the signal received from the antenna 97. Yet other parameters indicative of the quality of the received signal may be determined in other embodiments.

After determining information indicative of the quality of the received signal, the mobile device 100 may transit such information as feedback to the ring 52, and the processor 112 may use this feedback information to tune the antenna 97, similar to the techniques described above for the antenna 96.

In some embodiments, decisions about whether and when to tune an antenna may be based on several factors, including an amount of available energy in the power source 81. As an example, at least one sensor 77 may be configured to sense an amount of power in the power source 81, such as the charge level of the battery 83, for example. If the sensed level of energy is above a threshold, then the control circuitry 72 may be configured to enable tuning, as described above. However, if the sensed level of energy is below a threshold, then the control circuitry 72 may be configured to disable tuning and/or reduce the rate that tuning is performed so that power is conserved.

As noted above, the control circuitry 72 may be configured to initiate a payment transaction in response to the ring 52 being positioned in the magnetic field of a payment reader 22. In some cases, the ring 52 may be held in the magnetic field of the reader 22 for an extended time, thereby enabling longer communication between the reader 22 and the ring 52. As an example, it is possible for the ring 52 to be held within the magnetic field and, thus, able to communicate with the payment reader 22 sufficiently long to receive an indication whether the initiated payment transaction has been approved by the appropriate financial institution. However, in other examples, holding the ring 52 in the magnetic field for an extended time is unnecessary.

For example, some payment devices 10 are designed to enable a type of payment, sometimes referred to as "tap to pay" or "payment tap," where the payment device 10 is positioned within the reader's magnetic field for a relatively short time, such as just long enough to lightly tap the payment device 10 on the reader 22, though physical contact between the reader 22 and the payment device 10 is not actually required. The ring 52 may be configured to enable this type of payment, referred to hereafter simple as a "tap" or a "tapping" of the ring 52.

Figure 8:
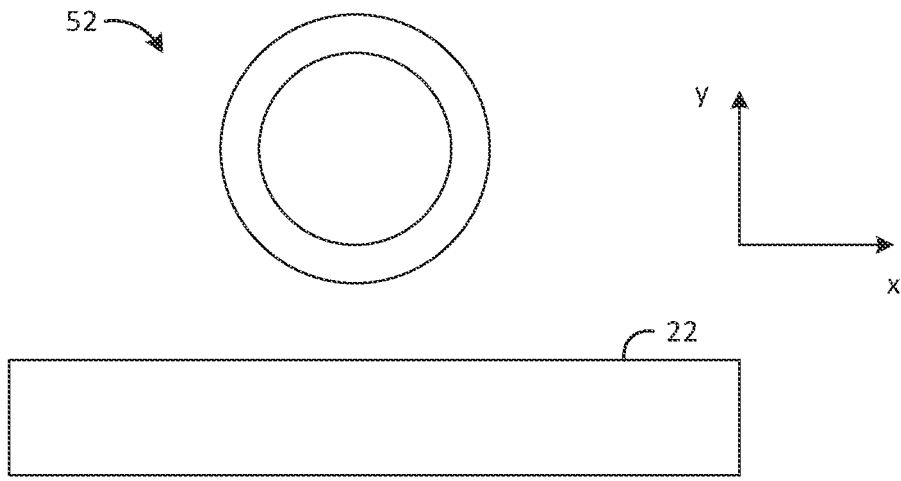
FIG. 8 depicts an illustrative side view of a ring, such as is depicted by FIG. 3, oriented vertically during a tap of a payment reader.
Figure 9:
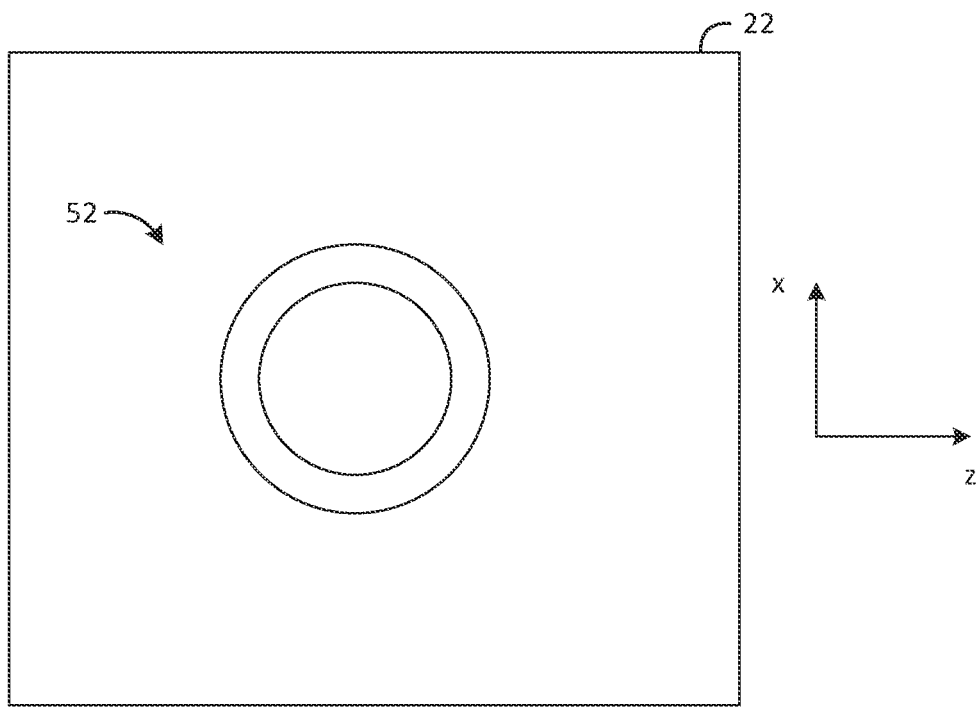
FIG. 9 depicts an illustrative top view of a ring, such as is depicted by FIG. 3, oriented horizontally during a tap of a payment reader.

Regardless of the type of payment transaction being performed, the ring's orientation during the payment transaction relative to the payment reader 22 may affect the communication performance between the ring 52 and the reader 22, particularly for passive load modulation. As an example, in some cases, the user may initiate a payment transaction by tapping the ring 52 while the ring 52 remains on his or her finger. In such an embodiment, the ring 52 is likely to be positioned substantially vertical relative to the reader 22 where the plane of the ring 52 is substantially perpendicular to the surface of the reader 22 being tapped (i.e., the surface closest to the ring 52 at the time of tapping), as shown by FIG. 8, thereby enabling the ring 52 to be positioned close to the reader 22. However, in other cases, the user may remove the ring 52 from his or her finger for the payment transaction and position the ring by hand in any of various orientations. As an example, while holding the ring 52 between two or more fingers or otherwise holding the ring 52 in another manner, the user may tap the ring 52 such that it is oriented substantially vertically as shown by FIG. 8 or substantially horizontally as shown by FIG. 9. Other angles of the ring 52 relative to the reader 22 are possible in yet other embodiments. In some cases, the user may be instructed to orient the ring 52 in a certain way (e.g., substantially vertical or horizontal) during the tap in order to keep the orientation and performance of the ring 52 substantially consistent from one tap to another.

Figure 10:
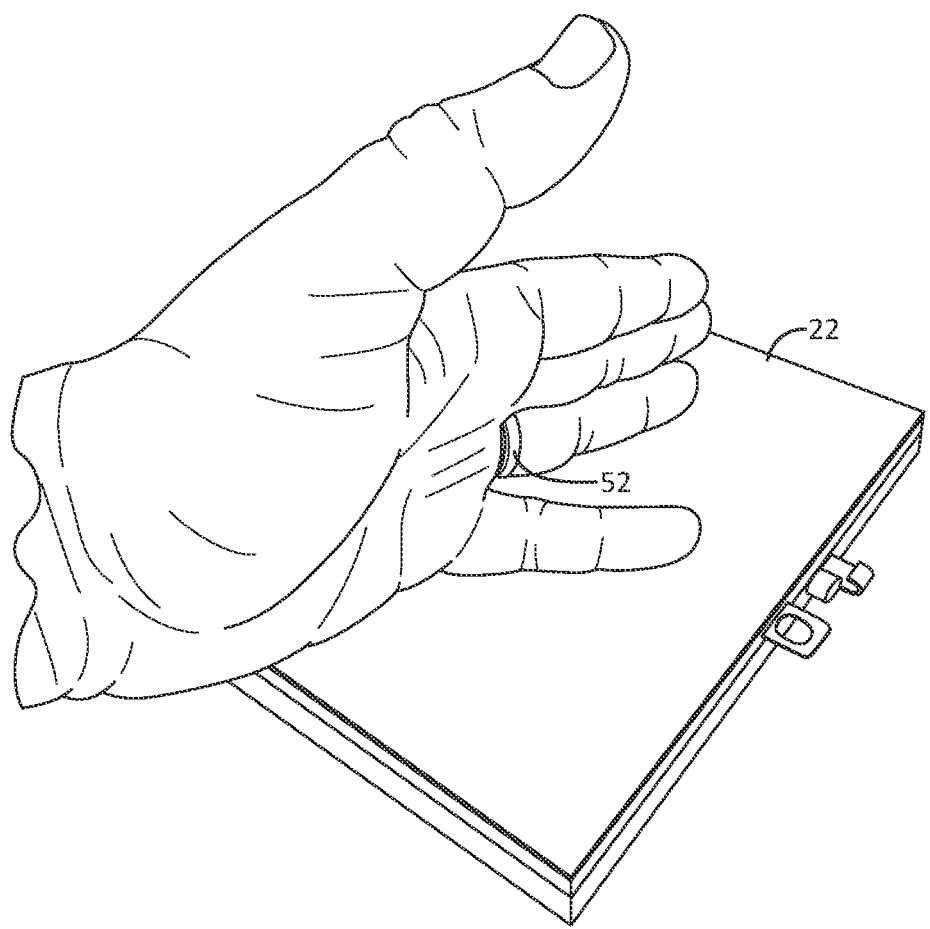
FIG. 10 depicts an illustrative perspective view of ring being worn by a user during a tap of a payment reader.
Figure 11:
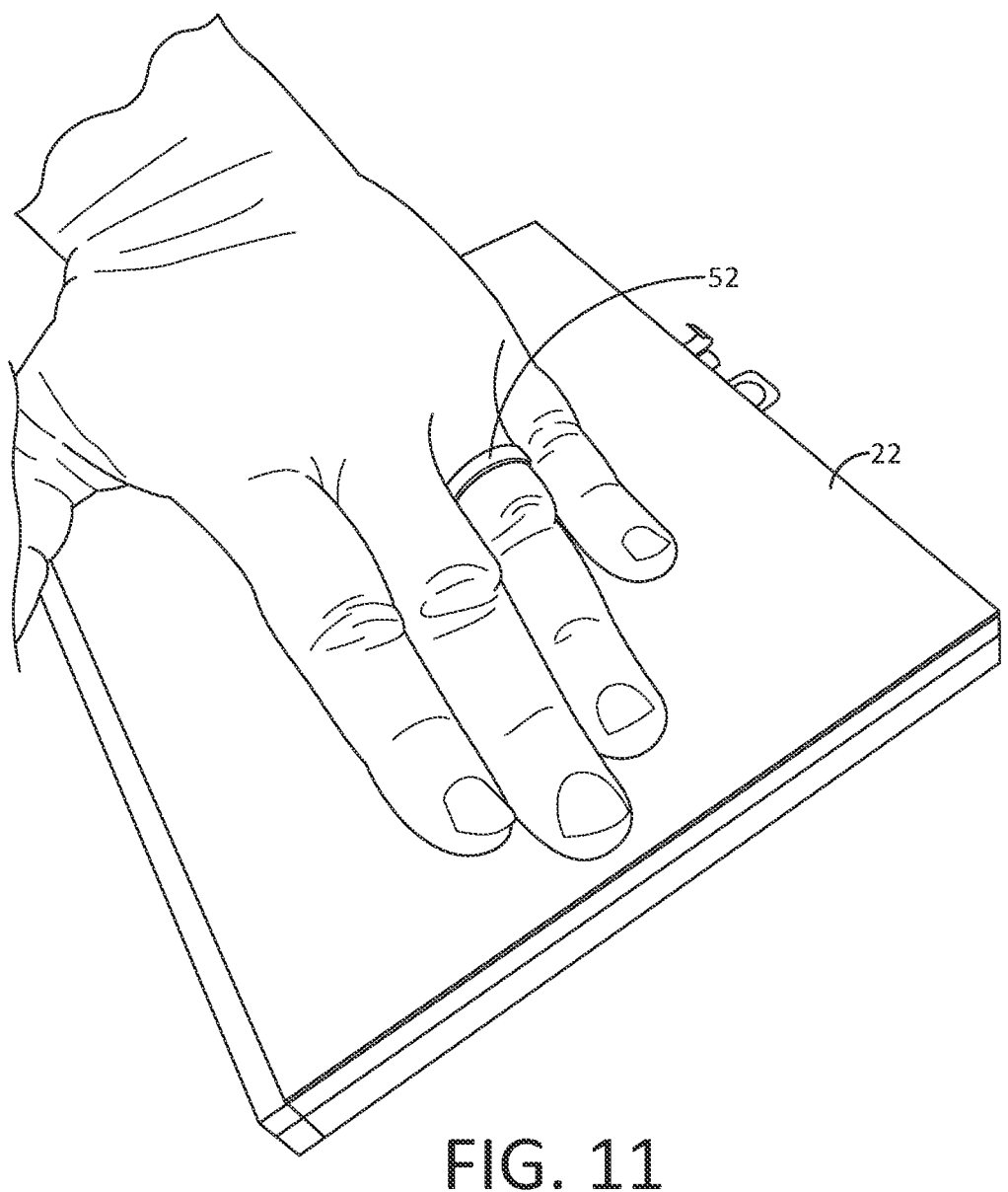
FIG. 11 depicts an illustrative perspective view of ring being worn by a user during a tap of a payment reader.
Figure 12:
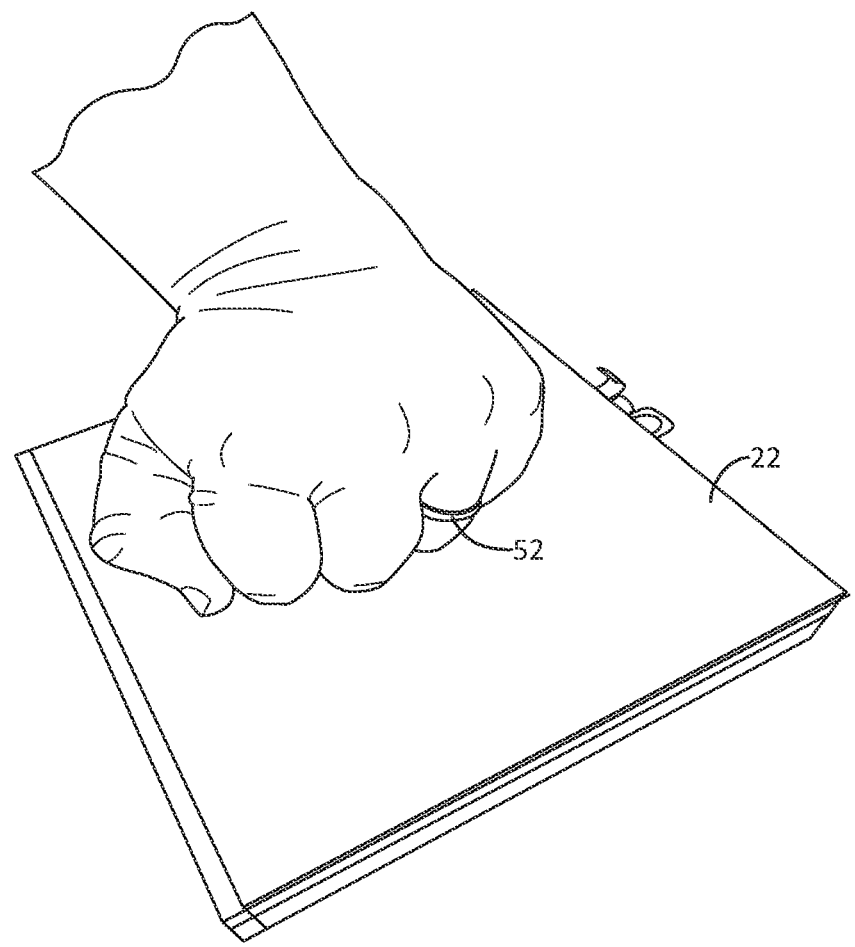
FIG. 12 depicts an illustrative perspective view of ring being worn by a user during a tap of a payment reader.

To assist with achieving consistent ring orientation during a tap, the user may perform the tap in a certain way. As an example, if the ring 52 is to remain on the user's finger, then the user may perform the tap with his or her hand oriented vertically while the ring 52 makes contact with the reader 22, as shown by FIG. 10. In another example, the user may perform the tap palm down where the user's palm makes contact with the reader 22, as shown by FIG. 11. In another example, the user may bend his or her fingers to form a first and contact with his or her knuckles as shown by FIG. 12. Various other types of hand orientations may be performed for other types of taps.

In some cases, the user may make certain predefined hand gestures while wearing the ring 52 or make other movements of the ring 52 as inputs to be used in the payment transaction. As an example, just before performing a tap, the user may wave his or her hand or perform another type of hand gesture to signify that a payment is authorized, thereby preventing inadvertent payments when the ring 52 is unintentionally moved into the magnetic field of a payment reader 22. In this regard, one or more sensors 77, such as accelerometers or gyroscopes, may be used to detect the predefined hand gesture. If such hand gesture is detected within a certain window of the tap (e.g., a certain amount of time before the tap), then the control circuitry 72 may be configured to perform a payment transaction in response to the tap. If such a hand gesture is not sensed within the window, then the control circuitry 72 may be configured to refrain from performing the payment transaction, assuming that the tap is not authorized (e.g., is unintentional).

In other examples, other inputs may be received via hand gestures or other movements of the ring 52. As an example, during a payment transaction the payment reader 22 or other device may be configured to display the amount of the payment, and the user may confirm such amount by performing one type of hand gesture (e.g., a vertical hand wave) or reject such amount by performing a different type of hand gesture (e.g., a horizontal hand wave). Some hand gestures or other types of ring movements may change the amount of the payment, such as adding a tip. As an example, after the initial tap of the ring 52, each wave of the user's hand or additional tap of the ring 52 may indicate a desire to add a tip of a certain percentage of the original payment amount. For example, if each additional tap adds a 5% tip, the user may tap the ring 52 three additional times if he or she desires to add a 15% tip. In some cases, a change to the orientation of the ring 52 may indicate certain input for the payment transaction, such as accepting or declining a payment amount or changing the payment amount (e.g., adding a tip). As an example, 90 degree rotation (e.g., from a vertical orientation to a horizontal orientation or vice versa) may indicate a certain input for the payment transaction. As previously indicated, the sensors 77 may include gyroscopes, accelerometers, and/or other sensors for detecting motion in order to sense the occurrences of the actions (e.g., hand gestures) to be interpreted as payment inputs.

In some cases, an input may be provided prior to the initial tap of the ring 52 for a payment transaction. When the control circuitry 72 detects a motion of the ring 52 indicative of an input (e.g., a predefined hand gesture or removal of the ring 52 from the user's finger), the control circuitry 72 may begin tracking time using a clock (not shown). If a tap of the ring 52 occurs within a predefined time period of the sensed motion, then the control circuitry 72 may interpret the motion as an input for use in the payment transaction. If a tap of the ring 52 does not occur within the predefined time period, the control circuitry 72 may ignore the sensed motion and not use it as an input for the payment transaction. In such a situation, it is possible that the user made the motion without the intent of using it as input to the next payment transaction.

In some cases, an input may be provided after the initial tap of the ring for a payment transaction. When the control circuitry 72 detects an initial tap of the ring 52 indicative of an input, the control circuitry 72 may begin tracking time using a clock (not shown). If a sensed motion of the ring 52 (e.g., a predefined hand gesture) occurs within a predefined time period of the initial tap, then the control circuitry 72 may interpret the motion as an input for use in the payment transaction. If sensed motion of the ring 52 does not occur within the predefined time period, the control circuitry 72 may ignore the sensed motion and not use it as an input for the payment transaction. In such a situation, it is possible that the user made the motion without the intent of using it as input to the payment transaction. If the sensed motion is made while the ring 52 is no longer in the magnetic field of the payment reader 22, then the user may perform an additional tap so that the input can be communicated as appropriate to the reader 22 for the payment transaction. Further, the hand motion being performed between two consecutive taps of the ring 52 where the two taps occur within a predefined window of time may indicate that the hand gesture or other ring movement occurring between the two taps is intended as an input for the payment transaction. That is, the control circuitry 72 may be configured to interpret a predefined movement as a certain input for the payment transaction if it occurs within a predefined window of a tap of the ring 52 and is within two consecutive taps. Other techniques for confirming a particular motion of the ring 52 as an input for the payment transaction are possible in other embodiments.

As noted above, the impedance and, thus, performance of the antenna 96 may be affected by whether the ring 52 is positioned on the user's finger. As used herein, a ring 52 is "positioned" or "worn" on the user's finger when a finger of the user passes through the ring 52 such that the ring 52 is secured to the finger without the user having to grip or otherwise hold the ring 52 with other fingers. Further, in an embodiment for which the ring 52 is to be removed from the user's finger to perform a payment transaction, the removal of the ring from the user's finger may signify that a payment transaction is about to occur. Thus, once removal of the ring 52 is detected, the control circuitry 72 may be responsive to the removal of the ring 52 for performing a tuning of the antenna 96 in order to help ensure that such antenna 96 is properly tuned prior to commencement of the payment transaction that is about to occur. In some cases, the tuning may be performed by the control circuitry 72 before the ring 52 is positioned within the magnetic field of the payment reader 22. As an example, the antenna 96 may be actively driven with energy from the power source 81 in order to perform the tuning, as described above. In other examples, the tuning may be performed by the control circuitry 72 after the ring 52 is positioned within the magnetic field of the payment reader 22. As an example, the feedback circuit 115 may measure the voltage of the antenna 96 and the current consumed by the antenna 96 (or other parameters indicative of antenna performance) while being driven by the carrier signal from the reader 22. Once the tuning is performed, the ring 52 may then perform active or passive load modulation of the carrier signal to communicate data to the payment reader 22.

Note that there are various techniques that may be used to detect when the ring 52 is inserted onto the user's finger. As an example, a sensor 77 may be a proximity sensor to sense when an object, such as a finger, is close to the sensor 77. In another example, one of the sensors 77 may be configured to sense a pulse of the user. If such a pulse is detected, the control circuitry 72 may determine that the ring 52 is on a finger of the user. Once the pulse is no longer detected over at least a predefined time interval, the control circuitry 72 may determine that the ring 52 has been removed from the user's finger.

In addition to sensing when the ring 52 is being worn, the information from one or more sensors may be used to authenticate the user who is wearing the ring 52 for payment transactions. As an example, it is generally known that a user's pulse has unique characteristics that can be used to identify him or her. In some embodiments, the pulse sensed by a sensor 77 is used to authenticate the user. That is, if the user is identified as an authorized user for performing payment transactions, then the control circuitry 72 is configured to enable payments. When payments are so enabled, the ring 52 may be configured to automatically initiate or approve a payment transaction when the ring 52 is positioned within the magnetic field of a payment reader 22. However, if the user is not authenticated, then the control circuitry 72 may be configured to disable payments. When payments are so disabled, the control circuitry 72 is configured to refrain from initiating or approving a payment transaction when the ring 52 is positioned within the magnetic field of a payment reader 22. Thus, if the ring 72 is moved to the magnetic field of a payment reader 22 when payments are disabled, no payment occurs until the user can provide sufficient authentication to establish himself or herself as an authorized user for payment transactions.

As noted above, for at some payment transactions, the user may remove the ring 52 from his or her finger and tap the ring 52 or otherwise position the ring 52 within the magnetic field of a payment reader 22 while the ring 52 is still removed from his or her finger. In such an embodiment, if the user wearing the ring 52 prior to its removal is authenticated, then the ring 52 is configured to communicate with the payment reader 22 for the purpose of performing a payment transaction. However, for security purposes, such enablement of a payment after removal of the ring 52 may last for a predefined time period, such as about one minute or other amount of time, from removal of the ring 52 from the user's finger. Such amount of time is preferably sufficient for the user to tap the reader 22 or otherwise use the ring 52 to interact with the reader 22 sufficiently to perform the payment transaction. However, once the payment transaction is performed or the predefined amount of time elapses without an occurrence of a payment transaction, the control circuitry 72 is configured to disable payments until the user is again authenticated, such as when the user puts the ring 52 back on the his or her finger. Disabling payments after elapsing of the predefined time period may prevent an unauthorized user from using the ring 52 to make an authorized purchase. For example, if the ring 52 is dropped or lost by the authorized user, another user who finds the ring and attempts to use the ring 52 to make a payment after the predefined time period should be prevented from using the ring 52 for the payment.

Figure 13:
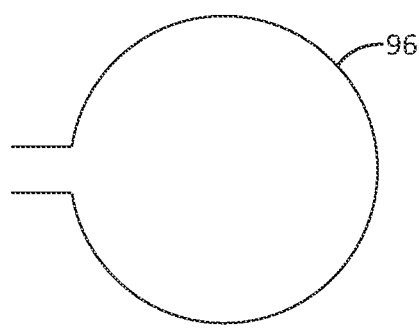
FIG. 13 depicts an illustrative top view of an antenna for use in a ring, such as is depicted by FIG. 3.

Note that the antenna 96 used for NFC may have any of a variety of shapes and configurations. In some embodiments, the antenna 96 may be positioned underneath the shell 63, such as within the mold 55. In this regard, the antenna 96 may form an open loop, as shown by FIG. 13 sized such that the user's finger is able to pass through the loop when the ring 52 is being worn on the user's finger. In some embodiments, the antenna 96 may form a multi-turn coil rather than a single loop. In some embodiments, the metallic shell 63 may be configured to function as the antenna 96. Note that either of the antennas 88 or 97 may be configured to form an open loop as described above with respect to antenna 96. As an example, the antenna 96 may be formed by the shell 63 and wrap around the user's finger, as described above, while an antenna 88 or 97 forms an open loop or a spiral within the mold and also wraps around the user's finger. Although it is unnecessary for any of the antennas to wrap around the user's finger.

Figure 14A:
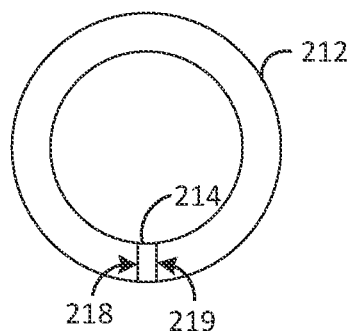
FIG. 14a depicts an illustrative top view of a metallic shell for a ring, such as is depicted by FIG. 3.
Figure 14B:
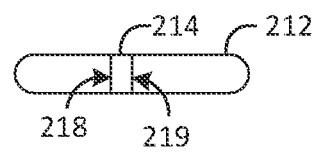

FIG. 14 shows an embodiment of a shell 63 that has a conductive portion 212 and an insulator 214 that separates one end 218 of the conductive portion 212 from the opposite end 219 of the conductive portion 212. The presence of the insulator 214 allows the shell 233 itself to form a closed loop while the conductive portion 212 forms an open loop, thereby improving the communication performance of the antenna defined by the shell 63. In some embodiments, an air gap may exist between the ends 218, 219 instead of an insulator 214 in order to provide the break or separation in the loop formed by the conductive portion 212. Further, even if the shell 63 is not electrically connected to the transceiver 91 for use as its antenna, the presence of the metallic loop formed by the shell 63 may degrade the communication performance of the transceiver 91 and its antenna 96. By configuring the shell 63 to break or interrupt the conductive path, as shown by FIG. 14, so that the metallic portion of the shell 63 does not form a complete loop (i.e., a closed loop), the communication performance of the NFC transceiver 91 and antenna 96 may be improved.

In some embodiments, the communication performance between the NFC antenna 96 and the payment reader 22 may be improved by positioning the antenna 96 so that it is closer to the payment reader 22 during a tap than the metallic shell 63, assuming that the metallic shell 63 is not being used as the antenna 96 (e.g., is not electrically coupled to the NFC transceiver 91).

Figure 15:
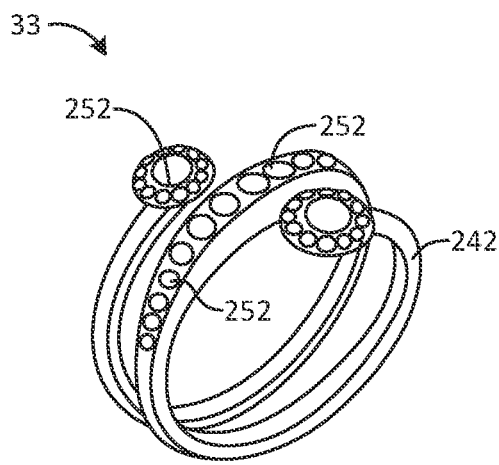
FIG. 15 depicts an illustrative perspective view of a metallic shell that may be used as an antenna for a ring, such as is depicted by FIG. 3.
Figure 16:
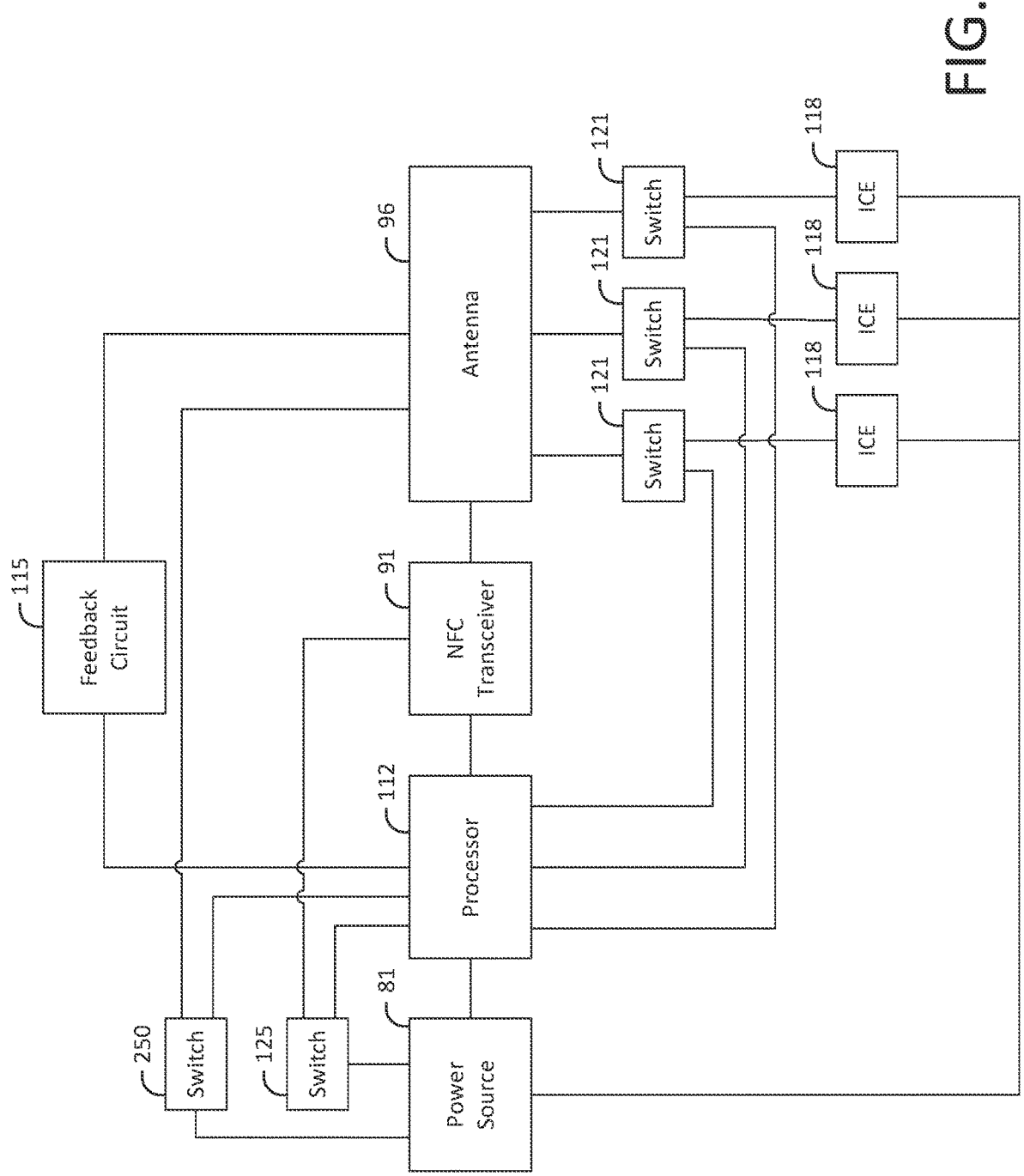
FIG. 16 depicts an illustrative block diagram of circuitry for use in a payment device to harvest energy and perform active load modulation with the same antenna.

FIG. 15 depicts an embodiment of a shell 63 having a conductive portion 242 that is spiraled in order form multiple turns that can improve the communication performance of the shell 63 when the shell 63 is used as an antenna for the NFC transceiver 91. That is, the spiraled conductive portion 242 of the shell 63 forms a multi-turn antenna for wirelessly transmitting signals. In FIG. 16, the transceiver 91 may make electrical contact with the spiraled conductive portion 242 at connection points 1, 2. In the embodiment of FIG. 15, the conductive portion has jewels 252 (e.g., diamonds) positioned thereon in an attempt to improve the aesthetic appearance of the shell 63. The use of such jewels 252 is unnecessary, and it is also unnecessary for pads to be used as the connection points for the transceiver 91.

Note that the use of active load modulation may have various benefits, including enhancing communication quality and reducing size requirements for the antenna 96 used for NFC. In passive load modulation, the transceiver 91 essentially adjusts its impedance to change the amount of energy it absorbs from the carrier signal transmitted by the reader 22. That is, the transceiver 91 modulates the carrier signal by essentially loading and unloading it, and the reader 22 senses the fluctuations of the carrier signal. Thus, the receiver sensitivity is limited by the amount energy that the transceiver 91 can load and unload from the reader 22. However, in active load modulation, the transceiver 91 actively transmits energy to be added or subtracted from the reader antenna. Thus, the transceiver 91 essentially sends energy to the reader 22 to modulate the carrier signal rather than absorbing energy from it. Thus, the receiver sensitivity can be significantly higher for active load modulation, thereby enabling the size of the antenna 96 to be reduced while still achieving comparable signal quality relative to passive load modulation. Indeed, by using active load modulation, the size of the antenna 96 may be sufficiently small such that the coil used for the antenna 96 does not need to wrap around the user's finger thereby conserving space for other components, such as antenna 88 or 97, which may wrap around the user's finger.

While the use of active load modulation for NFC may help improve communication performance and/or reduce the size of the antenna 96, it also requires power from the power source 81, potentially limiting the life of components of the power source 81, such as battery 83. In some embodiments, the harvesting antenna 88 (FIG. 5) may be used to provide energy to the power source 81 potentially increasing the useful life of at least some components of the power source 81.

To increase the amount of energy that may be harvested, the impedance of the harvesting antenna 88 may be optimized for harnessing energy from the environment, and the harvested energy may be provided to the power source 81 for use in powering components of the ring 52, such as for example performing active load modulation with the NFC transceiver 91 and antenna 96 or driving an antenna for tuning, as further described above. In some embodiments, the harvesting antenna 88 is optimized for harnessing energy from the magnetic field generated by payment readers 22. Thus, when the ring 52 is moved into the magnetic field of a payment reader 22 for the purpose of initiating a payment transaction (e.g., a tap) or other reason, the harvesting antenna 88 may harvest energy from the magnetic field and supply such energy to the power source 81.

When the ring 52 uses active load modulation to communicate with the payment reader 22, drawing energy from the magnetic field through the harvesting antenna 88 may degrade the communication occurring between the ring 52 and the payment reader 22. Thus, in some embodiments, the control circuitry 72 is configured to control the energy harvesting and the communication for the payment transaction such that they do not occur simultaneously.

As an example, when the ring 52 enters the magnetic field of a payment reader 22, the magnetic field is detected by the control circuitry 72, and in response, the control circuitry 72 controls the switch 89 such that it is in a closed state, thereby permitting energy harvested by the harvesting antenna 88 to pass through the switch 89 to the power source 81. Note that the switch 89 may be in the closed state prior to the ring 52 entering the magnetic field of the payment reader 22. In addition, while the switch 89 is in the closed state and energy is being harvested by the harvesting antenna 88, the control circuitry 72 disables the transceiver 91 from driving the NFC antenna 96. This may be performed in several ways. In one embodiment, the transceiver 91 is coupled to the power source 81 through switch 125, as shown by FIG. 7, and the control circuitry 72 controls the switch 125 such that it is in an open state.

After a period of time and while the ring 52 is still in the magnetic field of the reader 22, the control circuitry 72 disables energy harvesting by the antenna 88 and then enables the NFC transceiver 91 to drive the antenna 96 to perform active load modulation for communicating payment data 56 to the payment reader 22. As an example, the control circuitry 72 may transition the switch 89 to an open state, thereby preventing the power source 81 from receiving energy from the harvesting antenna 88, and then transition the switch 125 (FIG. 7) to a closed state, thereby enabling the NFC transceiver 91 to actively drive the antenna 96 with energy from the power source 81. That is, the control circuitry 72 disables energy harvesting by the antenna 88 and enables active load modulation by the transceiver 91 and antenna 96.

Note that the timing of the transition from energy harvesting to NFC may be controlled in a variety of ways. In one embodiment, the processor 112 is configured to begin tracking time via an internal clock (not shown) or otherwise once the magnetic field of the reader 22 is detected. After a predefined time from such detection, the processor 112 is configured to transition the ring 52 from energy harvesting to NFC by controlling the switches 89 and 125, as described above. Such time period can be selected to be sufficiently long such that the power source 81 is likely sufficiently charged to perform active load modulation of the payment data 56 but sufficiently short such that the ring 52 is likely to remain in the magnetic field of the reader 22 for a sufficient amount of time to communicate with the reader 22 for the payment transaction, assuming that a normal tap is being performed.

Once the payment data for the payment transaction has been communicated to the payment reader 22 via active load modulation, the control circuitry may disable the NFC transceiver 91 from actively driving the antenna 96 and enable the harvesting antenna 88 to provide energy to the power source 81. As an example, the control circuitry 72 may transition the switch 125 (FIG. 7) to an open state and then transition the switch 89 to a closed state.

In the embodiment described above, separate antennas are used for energy harvesting and NFC. In some embodiments, the same antenna may be used for both energy harvesting and NFC considering that both of these actions do not simultaneously occur in the instant embodiment. FIG. 16 shows an embodiment for which the same antenna 96 is used for both energy harvesting and NFC. In this regard, the NFC antenna 96 is coupled to impedance control elements 118 through switches 121 for controlling the impedance of the antenna 96, as described above for FIG. 6. Further, the NFC antenna 96 is coupled to the power source 81 through a switch 250 that permits energy to flow from the antenna 96 to the power source 81 when the switch 250 is in the closed state.

During operation, the processor 112 may be configured to enable energy harvesting and disable active load modulation by controlling the switch 250 to be in a closed state and the switch 125 to be in an open state, as described above. While in this state, the processor 112 is further configured to control the impedance of the NFC antenna 96 via the impedance control elements 118 such that the antenna 96 is optimized for energy harvesting. As an example, the processor 112 may control the switches 121 to selectively couple one or more of the impedance control elements 118 to the antenna 96 such that the NFC antenna 96 has a first impedance optimized for enhancing energy harvesting.

As described above, to transition the ring 52 from energy harvesting to NFC for communication of payment data, the switch 125 may be transitioned to a closed state, and the switch 250 may be transitioned to an open state. Upon so transitioning the mode of the ring 52, the processor 112 may adjust the impedance of the NFC antenna 96 so that it is optimized for NFC. In this regard, the processor 112 may control the switches 121 in order to change which of the impedance control elements 118 are electrically coupled to the antenna 96, thereby changing the impedance of the NFC antenna 96. Thus, during energy harvesting, the NFC antenna 96 may have a first impedance that is tuned for optimization of energy harvesting, and during NFC, the NFC antenna 96 may have a second impedance that is tuned for optimization of NFC.

Note that the same antenna 96 may be used for both energy harvesting and NFC communication in a similar manner when the NFC transceiver 91 is configured for passive modulation. The operation of the circuitry is essentially the same as described above, except that providing of power from the power source 81 may be unnecessary since the NFC transceiver 91 is not actively driving the antenna 96. In such embodiment, when energy harvesting is to occur, the processor 112 may enable energy harvesting by closing the switch 250 and disable the NFC transceiver 91 from attempting to perform passive load modulation. When NFC is to occur, the processor 112 may disable energy harvesting by opening the switch 250 and enable the NFC transceiver 91 to perform passive load modulation. Various techniques for enabling/disabling energy harvesting and enabling/disabling load modulation are possible, and the use of switches 250, 125 is unnecessary in other embodiments.

It should be noted that energy harvesting does not necessarily have to be from power received by a payment reader 22. As an example, the ring 51 may be moved in close proximity to a charging station (not shown) that provides a wireless signal for charging the power source 81. It is unnecessary for the charging station to perform NFC, payment transactions, or otherwise communicate with the ring 52. As an example, the user may use the charging station to recharge the power source 81 as he or she sleeps. Further, the frequency of the wireless energy from the charging station may be different than the frequency used by a payment reader 22 for NFC.

Figure 21:
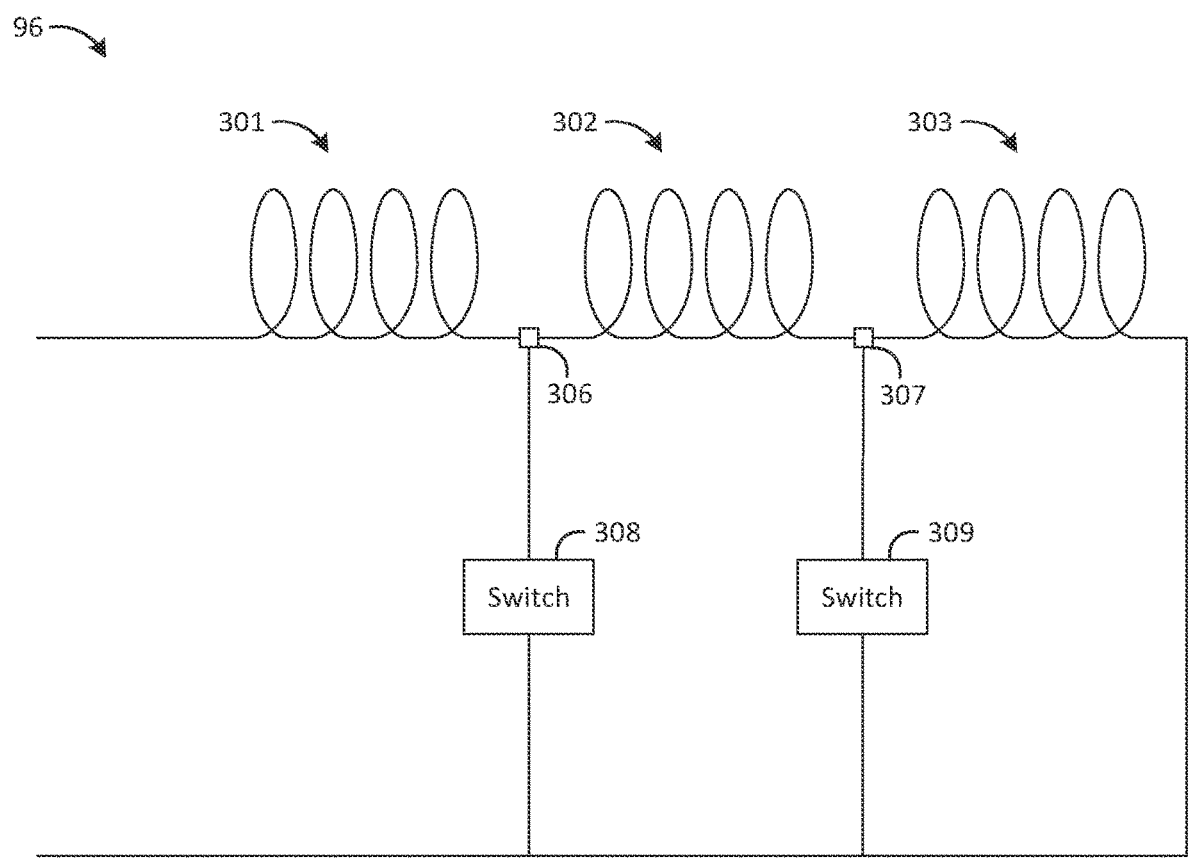
FIG. 21 shows a plurality of switches connected to taps of the antenna shown by FIG. 16 for selectively shorting stages of the antenna.

To assist with optimizing an NFC antenna 96 or other type of antenna for use to harvest energy, it may be desirable to effectively change the size of the antenna 96. The size of the antenna 96 can be effectively changed by shorting out portions of the antenna 96, thereby reducing the impedance of the antenna 96. As an example, refer to FIG. 21, which depicts an antenna 96 having a plurality of stages 301-303. Each stage 301-303 may comprise a coil having any number of turns. Between each stage 301-303 is a respective tap 306, 307 that is connected to a respective switch 308, 309 (e.g., a FET) that may be electrically coupled to and operate under the control of the processor 112 (FIG. 16). When each of the switches 308, 309 are open so that no current flows through the switches 308, 309, the size of the antenna 96 includes all of the stages 301-303. That is, each stage 301-303 contributes to the total impedance of the antenna 96. However, the switches 308, 309 may be selectively controlled to change the effective size of the antenna 96. For example, the switch 309 may be closed to short out the stage 303, thereby removing the impedance of this stage 303 from the antenna 96 and effectively changing the size of the antenna 96. Further, the switch 308 may be closed to short out the stages 302, 303, thereby removing the impedance of these stages 302, 303 from the antenna 96 and effectively changing the size of the antenna 96. Notably, impedance control elements 118 may also be coupled to various taps of the antenna 96, as shown by FIG. 16, to enable further tuning of the antenna 96. Thus, the overall impedance and performance of the antenna 96 can be significantly altered by the processor 112 by controlling the states of the switches 121 (FIG. 16) and switches 308, 309 (FIG. 21), thereby enabling the same antenna 96 to efficiently function for different purposes, such as energy harvesting in one example and NFC (or other type of communication) in another example.

In various embodiments described above, the ring 52 is described as having an NFC transceiver 91 and antenna 96 for communicating with a payment reader 22 using NFC and also having a short-range transceiver 92 and antenna 97 for communicating with the mobile device 100 using Bluetooth or some other short-range protocol. In some embodiments, the use of a short-range transceiver 92 and antenna 97 is unnecessary. As an example, the mobile device 100 may be configured to communicate via NFC, and the NFC transceiver 91 and the antenna 96 may be used to communicate via NFC with the payment reader 22 and the mobile device 100, thereby eliminating the need of having a separate short-range transceiver 92 and antenna 97. In such an embodiment, the ring 52 may operate as described herein for any of the embodiments except that communication with the mobile device 100 occurs through the NFC transceiver 91 and antenna 96 rather than the short-range transceiver 92 and antenna 97.

The ring 52 may be used for various types of financial accounts, such as credit card accounts, debit card accounts, and cash card accounts. Each of these accounts may be associated with certain spending properties, such as credit limits or spending caps. As shown by FIG. 6, the ring 52 may store data 275, referred to hereafter as "spending properties data," indicative of the spending properties for one or more financial accounts associated with the ring 52. During a payment transaction, the payment reader 22 may communicate information about the payment transaction to the ring 52, and the control circuitry 72 may compare such information to the spending properties data 275 to determine whether the payment transaction is permitted based on the spending properties indicated by the data 275. For example, if the purchase price exceeds a limit indicated by the spending properties data 275, the control circuitry 72 may decline the payment transaction such that a payment is not effectuated.

Note that the spending properties data 275 may also indicate the type of payment transaction that is to be performed, such as a credit card transaction, debit card transaction, or cash card transaction. In some cases, the spending properties data 275 and payment data 56 may include information only for a single financial account. In other cases, the spending properties data 275 and payment data 56 may include information for multiple financial accounts, and the control circuitry 72 may be configured to select one of the financial accounts based on inputs received at the time of the payment transaction, such as predefined hand gestures or other predefined movements of the ring 52 or inputs received from the mobile device 100.

In addition, rather than storing actual account information in the payment data 56, such as the account number of a financial account to be used for payments, it is possible to store tokens associated with the financial accounts, thereby preventing unauthorized users to obtain valid account information from the information stored in the ring 52. In this regard, a token stored in the ring 52 may be associated at a server with valid account information, including an account number of a financial account. When a tap occurs with the ring 52, the token may be communicated by the ring 52 to the payment reader 22, which may forward the token to the aforementioned server that determines, based on the token, the associated financial account information to be used for the payment. A payment request for the amount of the purchase may then be sent to a payment server of the issuing financial institution.

In some embodiments, the ring 52 may employ one or more processes for selecting or assisting the user in selecting a financial account to be used for a payment. For example, the spending properties data 275 may include user preferences indicating which financial account the user desires to use for certain scenarios. If the control circuitry 72 is capable of identifying a scenario for which the user prefers a specific account, then the control circuitry 72 may be configured to automatically select the preferred account, and use such account for a payment transaction.

As an example, the financial institution providing a financial account may provide certain rebates or benefits for using the account at a certain type of merchant, such as a gas station or restaurant. When making a payment at such a merchant, the user may prefer to use a first financial account that offers such rebates or benefits but use a different financial account for purchases at different types of merchants. In some embodiments, the control circuitry 72 is configured to identify a merchant type associated with a payment transaction and compare the merchant type to the user preferences stored in the spending properties data 275. If the spending properties data 275 indicates that the user prefers a specific financial account for the identified merchant type, then the control circuitry 72 is configured to use such financial account for the payment. If desired, before selecting the financial account for payment, the control circuitry 72 may communicate with the mobile device 100 via the short-range transceiver 92 and antenna 97 requesting the user to confirm selection of this financial account for payment. If the user so confirms, then the control circuitry 72 selects the financial account for the payment transaction being performed. Thus, the control circuitry 72 helps to facilitate the transaction by reducing the burden on the user to identify which financial account is to be used for payment.

Note that there are a variety of techniques that may be used to identify the type of the merchant involved in the payment transaction. In some embodiments, the merchant type may be communicated to the ring 52 by the payment reader 22 via NFC transceiver 91 and antenna 96 during a tap of the reader 22 by the ring 52. In other embodiments, the location of the user wearing the ring 52 may be used to identify merchant type. As an example, the mobile device 100 may have a software application, such as Google Maps, defining a geographic map indicative of geographic locations of merchants and indicating the merchant type associated with each merchant. The mobile device 100 may also have a location sensor, such as global positioning system (GPS) sensor, for determining a location of the mobile device 100. A software application on the mobile device 100 for interacting with the ring 52 may be configured to compare the location of the mobile device 100, as determined form the location sensor, to merchant locations indicated by the map to determine the type of merchant at or near the user's location at the time of a payment transaction. Information indicative of the merchant type may be communicated by the mobile device 100 to the ring 52 via the short-range transceiver 92 and antenna 97, and the control circuitry 72 may use the merchant type information to select a financial account for payment, as described above.

In some cases, the identification of the merchant type may be triggered by an event associated with the payment transaction, such as when the reader 22 is tapped by the ring 52. In this regard, when the control circuitry 72 detects the magnetic field of the reader 22, the control circuitry 72 may communicate with the mobile device 100 to request the merchant type information described above. Alternatively, the mobile device 100 may be configured to track the user's movements and notify the ring 52 when the mobile device 100 determines that the user has entered the premises of a new merchant so that the merchant type information is already known to the ring 52 at the time of the tap.

In addition, there may be other rules for selecting financial accounts based on geographic location. For example, the user may provide inputs for indicating different geographic regions where he or she prefers to use a specific financial account. If the user is within such a region at the time of initiation of a payment transaction, the control circuitry 72 may be configured to select the financial account that is associated with such region for the payment transaction. Yet other techniques for determining when to communicate merchant type information to the ring 52 are possible in other embodiments.

It is also possible for the control circuitry 72 to select a financial account for payment based on other information associated with the payment transaction, such as the purchase amount. For example, the spending properties data 275 may include a threshold that is used to select a financial account. If the purchase amount is below the threshold, then the control circuitry 72 may be configured to select a first financial account for the payment transaction. However, if the purchase amount is above the threshold, then the control circuitry 72 may select a different financial account of the payment transaction. Note that the different financial accounts may have different spending properties and/or security measures. For example, the financial account selected when the purchase amount is below the threshold may not require the user to enter a PIN or provide other inputs. However, the financial account selected when the purchase amount is above the threshold may require the user to enter a valid PIN or provide some other input to confirm the transaction or authenticate the user.

Note that it is possible for functions described herein as being performed by the control circuitry 72 to be performed, at least in some embodiments, by the mobile device 100 and vice versa. As an example, in the above embodiment in which the mobile device 100 determines its location and the merchant type associated with the payment transaction, it is possible for control circuitry 72 to perform this function. However, having the mobile device 100 perform various functions described herein helps to reduce the data, power, and size requirements of the ring 52.

If desired, the spending properties data 275 and payment data 56 may be updated from time-to-time. For example, credit limits or spending caps may be changed or financial accounts may be added to or removed from the data 275, 56. Updates for changing the spending properties data 275 may be transmitted from a server of a financial institution through the mobile device 100 to the ring 52. In this regard, each financial account indicated by the spending properties data 275 and payment data 56 may be associated with a software application stored on the mobile device 100, and this software application may be used to communicate between the mobile device 100 and ring 52 for such financial account. For example, the software application may display a customized GUI for the financial account that can be used by a user to provide any of the inputs or receive any of the outputs described herein for the associated financial account. The software application also may be configured to communicate with a payment sever of the financial institution through the Internet and/or other types of networks, and when an update to the spending properties data 275 and/or payment data 56 is desired, the server may communicate the update through the software application of the mobile device 100 to the ring 52.

Further, when a new financial account is to be added, the mobile device 100 may be used to download a software application for the financial account, and this software application may communicate with ring 52 in order to store spending properties data 275 and payment data 56 related to the financial account in the memory 58, thereby enabling the ring 52 to be used for a payment transaction associated with that financial account. Thus, the financial accounts and the spending properties related to the financial accounts may be updated as desired over time.

As for any payment device 10 that is used for making financial payments, it is generally desirable to implement security features to ensure that a payment transaction is authorized and is not being mistakenly or fraudulently performed. It is possible for the mobile device 100 to be used to implement at least some security measures. As an example, the mobile device 100 may be used to authenticate a user and/or receive the user's approval of a payment transaction. Such authentication and/or approval may be communicated to the ring 52, which uses this information to perform a payment transaction. However, for convenience and expediency, it may be desirable to implement at least some security measures through the ring 52 without requiring manual input through the mobile device 100.

As an example, rather than using the mobile device 100 to authenticate the person wearing the ring 52, the ring 52 may be configured to authenticate the user based on the sensors 77, such as a sensor for detecting the user's pulse. Such authentication may be used to unlock the ring 52 for the purposes of performing a payment transaction. That is, the ring 52 may remain locked for the purposes of payment transactions unless the ring 52 can authenticate the user wearing the ring 52 at the time of a given payment transaction. In other embodiments, other techniques may be used to authenticate the user. Further, in some embodiments, at least some payments may be authorized without user authentication, such as payment transactions associated with a payment amount below a predefined threshold.

As noted above, the ring 52 may be configured to sense certain movements, such as hand gestures, and interpret these movements as inputs. Such hand gestures may be used to authenticate the user in at least some embodiments. In this regard, the user may manually tap a certain predefined code into the ring 52 by using his or her fingertip or other object to lightly touch the ring in a certain pattern (e.g., similar to Morse code). In this regard, the sensors 77 may include accelerometers that sense vibrations from each tap so that the control circuitry 72 can detect the pattern tapped into the ring 52 by the user. If the pattern matches a predefined pattern associated with the ring 52 for a financial account to be used for a payment transaction, then the control circuitry 72 may authenticate the user for purposes of performing the payment transaction. In some embodiments, such tapping by the user on the ring 52 may be used for other types of inputs, such as approval of a purchase amount, selection of a financial account to be used for a payment transaction, or any other input described herein.

In addition, at least some outputs associated with a payment transaction may be provided through the ring 52. In this regard, as shown by FIG. 5, the electrical system 58 may include at least one output device 288 for providing outputs to a user. In one embodiment, the output device 288 may be a haptic device that briefly vibrates to notify the user of an occurrence of an event, such as a tap of the ring 52 on a payment reader 22 or confirmation that a payment has been requested or approved. In some embodiments, the output device 288 may be an optical device, such as a light emitting diode (LED) or some other type of light source, for providing a visible output. As an example, the output device 288 may blink light or otherwise generate light temporarily to notify the user of an occurrence of an event, such as a tap of the ring 52 on a payment reader 22 or confirmation that a payment has been requested or approved. Notably, any of the user inputs or outputs described for the ring 52 may alternatively be received from or communicated to a user through the mobile device 100, if desired.

To better illustrate some of the concepts described above, assume that a user desires to use the ring 52 to make a financial payment, such as to purchase a good or service. The payment reader 22 may receive information about the payment transaction, such as the amount of payment and any other merchant information that may be required for approval of a financial payment. As an example, the payment reader 22 may be coupled to or otherwise communicate with a merchant device 29 (FIG. 2) that is used to provide the payment reader 22 with details regarding the payment transaction.

To make the desired purchase, the user may approach the payment reader 22 and tap the ring 52 on the payment reader 22. That is, the user may position the ring 52 sufficiently close to the reader 22 such that the ring 52 is within the magnetic field generated by the reader 22. The magnetic field (which is centered at a certain frequency, such as about 13.56 MHz) is detected by the control circuitry 72, and in response, the control circuitry 72 performs various actions for initiating a payment request, as will be described in more detail below.

In this regard, if the user has been sufficiently authenticated, the control circuitry 72 retrieves from memory 58 payment data 56 for the payment transaction, such as the account number of the financial account to be used for the payment and any information required for approval of the payment by the associated financial institution. Using active or passive load modulation, the control circuitry 72 transmits the payment data 56 to the payment reader 22 using the NFC transceiver 91 an antenna 96. Upon receiving such payment data, the payment reader 22 may communicate to the ring 52 an acknowledgment of the reception of this data. In response to this acknowledgement, the control circuitry 72 may provide feedback to the user, such as an output (e.g., haptic or visual feedback) via the output device 288, thereby informing the user that a payment has been requested.

Based on the payment data 56 from the ring 52 and the purchase information received from the merchant, the payment reader 22 may form a request for payment and transmit the request to a payment server of the financial institution associated with the financial account being used for payment. After approving or declining the payment, the payment server of the financial institution transmits to the merchant a notification indicating whether the payment is approved or declined. If the ring 52 remains in communication with the reader 22 after the payment has been approved or declined, information indicating whether the payment has been approved may be transmitted by the reader 22 to the ring 52. In response to this information, the control circuitry 72 may provide feedback to the user, such as output (e.g., haptic or visual feedback) via the output device 288, thereby informing the user whether the payment request has been approved.

Alternatively, feedback indicating when a payment has been requested or whether the payment has been approved may be provided to the user through the mobile device 100. As an example, the ring 52 may be configured to communicate such information to the mobile device 100, which then provides the notifications to the user. Alternatively, such notifications may be transmitted by the payment reader 22, the merchant device 29, or the payment server of the financial institution to the mobile device 100 using Bluetooth and/or one more networks, such as the Internet and/or a cellular network.

In various embodiments described above, the ring 52 has been described in the context of making financial payments. However, other uses of the ring 52 are possible. As an example, the ring 52 may use the NFC transceiver 91 or the short-range transceiver 92 to communicate with other types of readers, such as readers that are used for tracking employees or other personnel or controlling access to certain physical areas. As an example, the ring 52 may store a user identifier that identifies the user wearing the ring 52. Such user may bring the ring 52 sufficiently close to a reader to enable communication with the reader. The ring 52 may then communicate the user identifier to the reader, which then uses the user identifier for any of various purposes. As an example, the reader may use the user identifier to authenticate the user for various purposes, such as permitting the user to enter a restricted area. In this regard, if the user is authenticated, the reader may cause a door to the restricted area to be unlocked so that the user may use the door to enter the restricted area. In another example, the reader may have a user output device, such as display, that provides an output (e.g., a visual indication that the user is authorized to enter an area). This indication may then be used to permit entry of the user to an area.

As an example, a particular entertainment event or venue, such as a concert or a bar, may be ticketed (i.e., require a ticket purchase to be permitted entry at the event or venue). The ring 52 may be used to purchase a ticket to the event or venue according to the techniques described above for making a payment transaction. Once the payment transaction is complete, the payment reader 22 or other device may communicate with the ring 52 to transmit an authorization code that can be used to establish the user's permission to enter the event or venue. That is, rather than issuing a physical ticket to the event or venue, the user may be provided with an electronic ticket in the form of an authorization code that may be used authenticate the user as permitted to enter the event or venue.

In such an example, a reader may be positioned near the entrance of the event or venue. The user may tap the reader or otherwise bring the ring 52 sufficiently close to the reader so that the ring 52 is in the magnetic field of the reader. In response to the magnetic field and/or a query from the reader, the authorization code previously stored in the ring 52 may be transmitted from the ring 52 to the reader, which uses the authorization code to determine whether the user is permitted to enter the event or venue. An output indicative of such determination may be provided (e.g., displayed) to a bouncer or other person at the entrance responsible for controlling ingress to the event or venue. Based on such output, the bouncer or other person may permit the user of the ring 52 to enter the event or venue.

Note that it is unnecessary for the user to use the ring 52 to purchase the ticket. As an example, upon purchasing the ticket, the user may be provided a ring 52 to use for the purpose of obtaining entry to the event or venue according to the techniques described above.

In other examples, a user identifier communicated by the ring 52 to a reader may be used for other purposes. As an example, the user identifier may be used to log the user as arriving to or leaving his or her place of employment. That is, the user identifier is used to clock-in or clock-out the user so that his or her employer may have a record of when the user arrived and left a work premises. Note that the user identifier may be associated with authentication information that may be used to confirm that the person wearing the ring 52 is in fact the one identified by the user identifier. As an example, as described above, the control circuitry 72 may be configured to measure the user's pulse and compare information of the measured pulse to the authentication information stored by the ring 52 to determine whether there is sufficient correlation to authenticate the user. If so, then the control circuitry 72 may be configured to provide the user identifier to the reader. However, if the user is not authenticated, the control circuitry 72 may be configured to refrain from providing the user identifier. As an example, the control circuitry 72 may instead provide a notification that the user wearing the ring 52 is not identifiable, thereby preventing the identified user as being mistakenly identified and entering or leaving the premises.

If access to the employer's premises is restricted, the user identifier may also be used to determine whether to permit the user entry to the restricted area. If desired, a photograph of the user may be stored in the ring 52 (e.g., downloaded to the ring 52 by the mobile device 100 or other device), and this image may be communicated to the reader via the NFC transceiver 91 or short-range transceiver 96 when the ring 52 is tapped or otherwise positioned sufficiently close to the reader for communication. This image may be displayed by a display device connected to or in communication with the reader so that the identity of the user can be confirmed by comparing the user to the displayed image. Note that use of such an image may also be used at an event or venue to help confirm the user's identity before permitting the user to enter the event or venue. Various other types of uses of the ring 52 are possible in other embodiments.

As noted above, the ring 52 is just example of a payment device 10 that may be used to implement the techniques and configurations described herein. The techniques and configurations described above may be used in other types of payment devices 10, including both wearable payment devices, such as other types of jewelry (e.g., watches, bracelets, and pendants) and non-wearable payment devices, such as payment cards (e.g., credit cards, debit cards, and cash cards).

Figure 17:
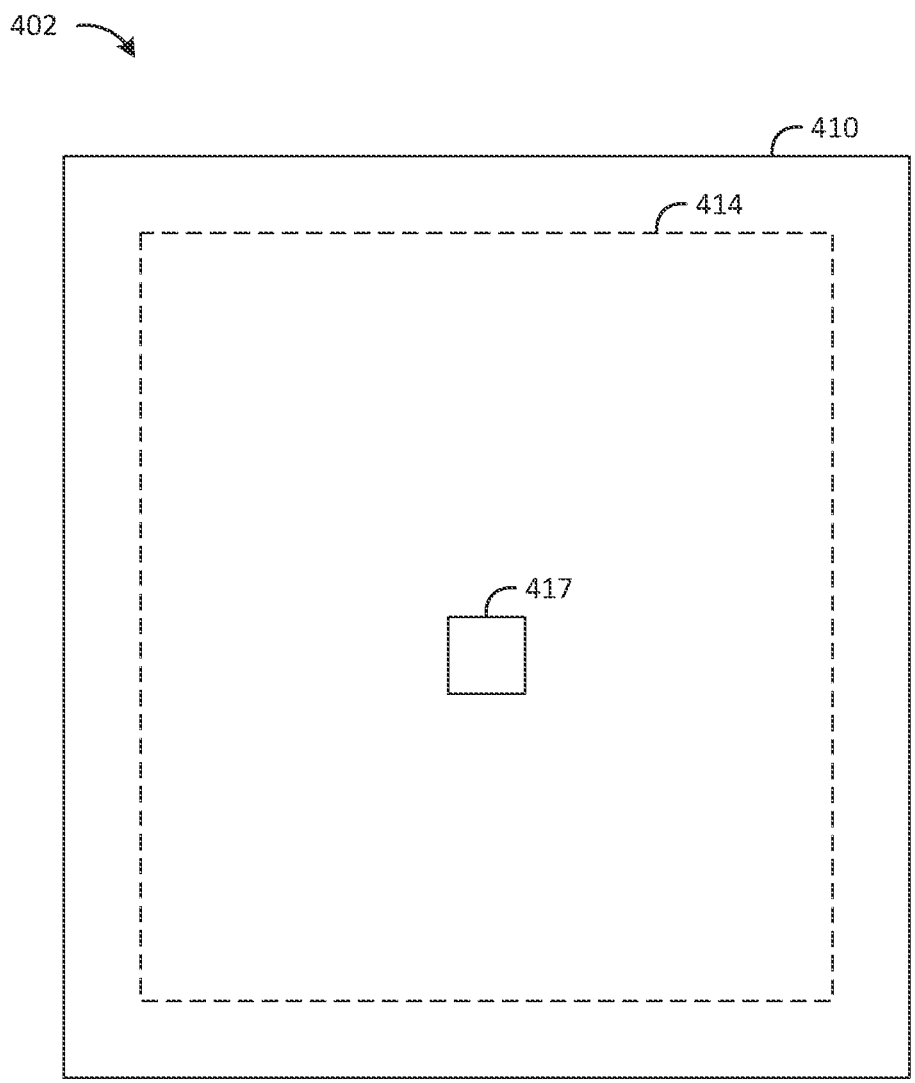
FIG. 17 is a top view of conventional payment reader that is tap enabled.

FIG. 17 depicts a top view of a conventional tap-enabled card reader 402 designed for use with payment cards, such as credit cards, debit cards, or cash cards. The reader 402 has a housing 410 that houses electrical components of the reader 22, including an NFC antenna 414, which may be hidden from view by the housing 410. The housing 410 and antenna 414 may be substantially shaped as a rectangle as shown, though other shapes are possible. The housing 410 typically has a marker 417 near its center. The marker 417 may be a label, printed matter, or other type of marker having graphical or textual markings indicating that the reader 402 is tap enabled. That is, the marker 417 indicates to a user that a payment may be made by simply positioning an EMV payment device with an NFC chip near the marker 417. Such marker 417 may encourage a user making a payment to place the center of a payment card near the marker 417.

The NFC antenna 414 is relatively large extending around the perimeter of the reader 402. In addition, the NFC antenna on many conventional payment cards is also relatively large. Notably, the field strength at the center of the antenna 414, which is close to the marker 417, is relatively weak. Since the NFC antenna on many conventional payment cards is relatively large, such antenna likely is has one or more points positioned close to the antenna 414 of the reader 402 when the payment card is positioned close to the marker 417. In this regard, the energy received from the reader antenna 414 by the NFC antenna of the payment card depends on the size of the card's antenna and its location relative to the reader antenna 414. For a relatively large card antenna having points positioned close to the reader antenna 414, the receive strength is relatively good.

However, if a small payment device 10, such as a ring 52 or other wearable payment device, having a relatively small antenna is positioned near the marker 417, then the receive strength will likely be much weaker. In this regard, the NFC antenna 96 of the ring 52 or other wearable device is at a location of relatively low signal strength for the carrier signal transmitted by the reader antenna 414. Thus, by placing a ring 52 or other small payment device 10 at the marker 417, as is typically done for conventional payment cards, the communication performance between the reader 402 and the ring 52 or other small payment device 10 is likely to be poor.

Figure 18:
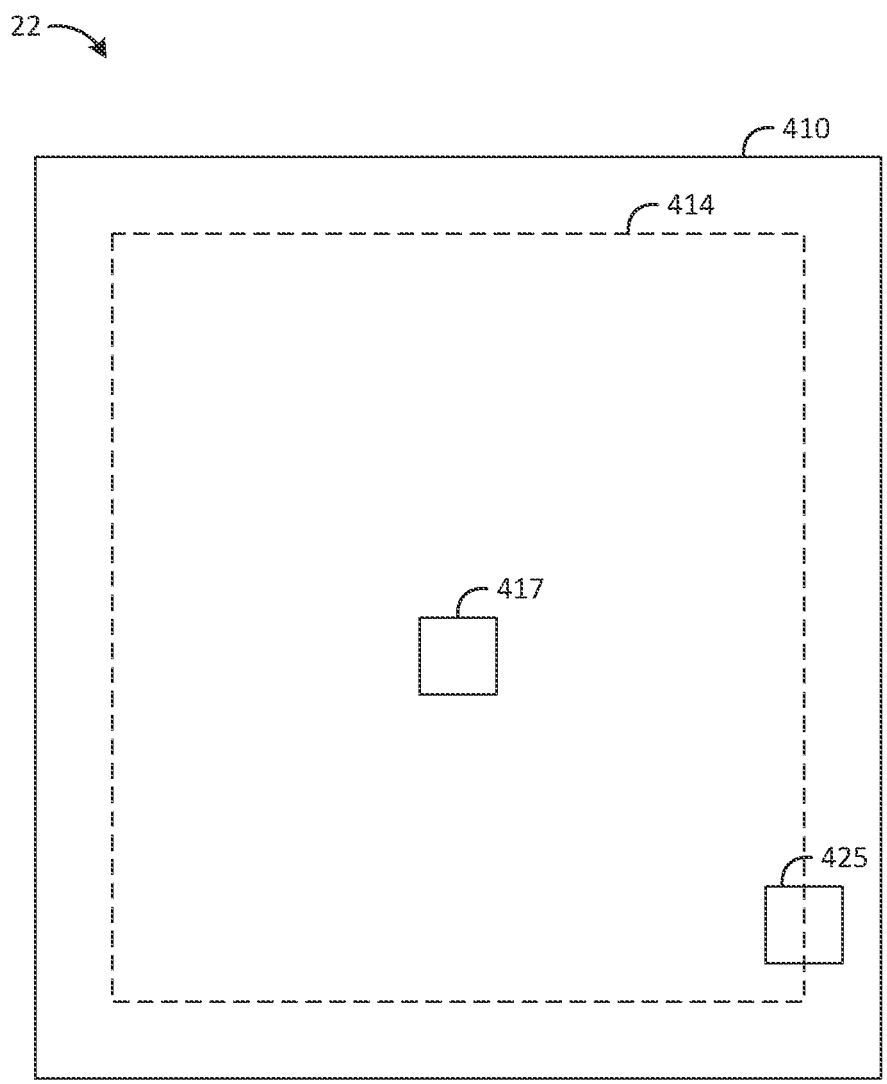
FIG. 18 is a top view of a payment reader that is tap enabled and has a marker for guiding a user in performing a tap by a small payment device, such as a wearable payment device.

One solution to address this problem is to add a new marker 425 having a graphic or message associated with small payment devices 10, such as rings 52 or other wearable payment devices, as shown for the illustrative reader 22 depicted by FIG. 18. Users of such small payment devices 10 may recognize the marker 425 and be encouraged to position their small payment devices 10 near the marker 425 rather than the marker 417, which has a graphic or message associated with conventional payment cards. Further, the location of the marker 425 may be selected such that it is near the reader antenna 414. Thus, a user who positions his or her small payment device close to the marker 425 likely positions its NFC antenna 96 near the reader antenna 414 thereby improving the communication performance between the payment device 10 and reader 22 relative to an embodiment for which the small payment device 10 is positioned near the marker 417.

Figure 19:
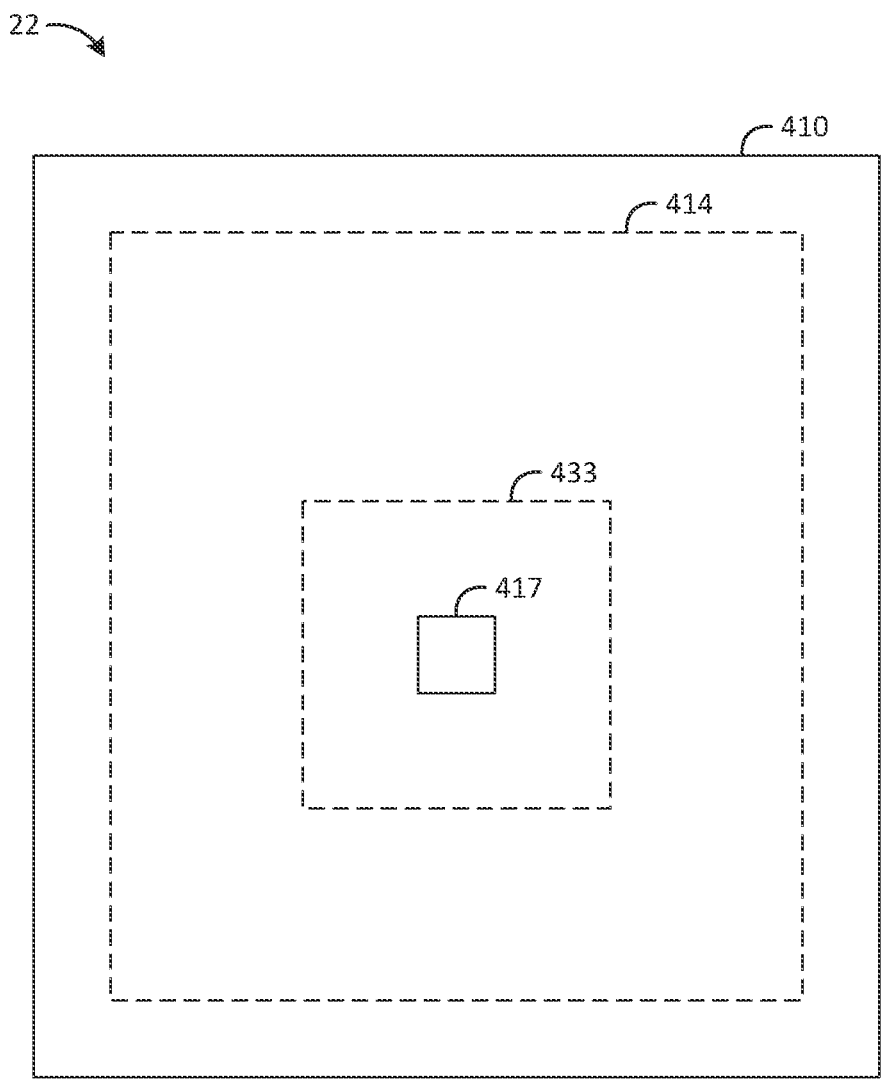
FIG. 19 is a top view of a payment reader having a small antenna positioned within a larger antenna for use in communicating with a small payment device, such as a wearable payment device.

Another possible solution is to reconfigure the reader antenna 414 such that it runs close to the marker 417 or configure the reader 22 with an additional NFC antenna located near the marker 417. FIG. 19 depicts an embodiment for which an NFC antenna 433 that is smaller than the reader antenna 414 for conventional payment cards is positioned near the marker 417. In such embodiment, when a small payment device 10, such as a ring 52 or other wearable payment device, is positioned near the marker 417, the NFC antenna 96 of the payment device 10 should be positioned close to the antenna 433 where the field strength from the antenna 433 is relatively high. Thus, communication performance between the antenna 96 of the payment device and the reader antenna 433 should be relatively good. In such embodiment, the payment data communicated by the payment device 10 may be received by the antenna 433 and used by the reader 22 to perform a payment transaction.

Figure 20:
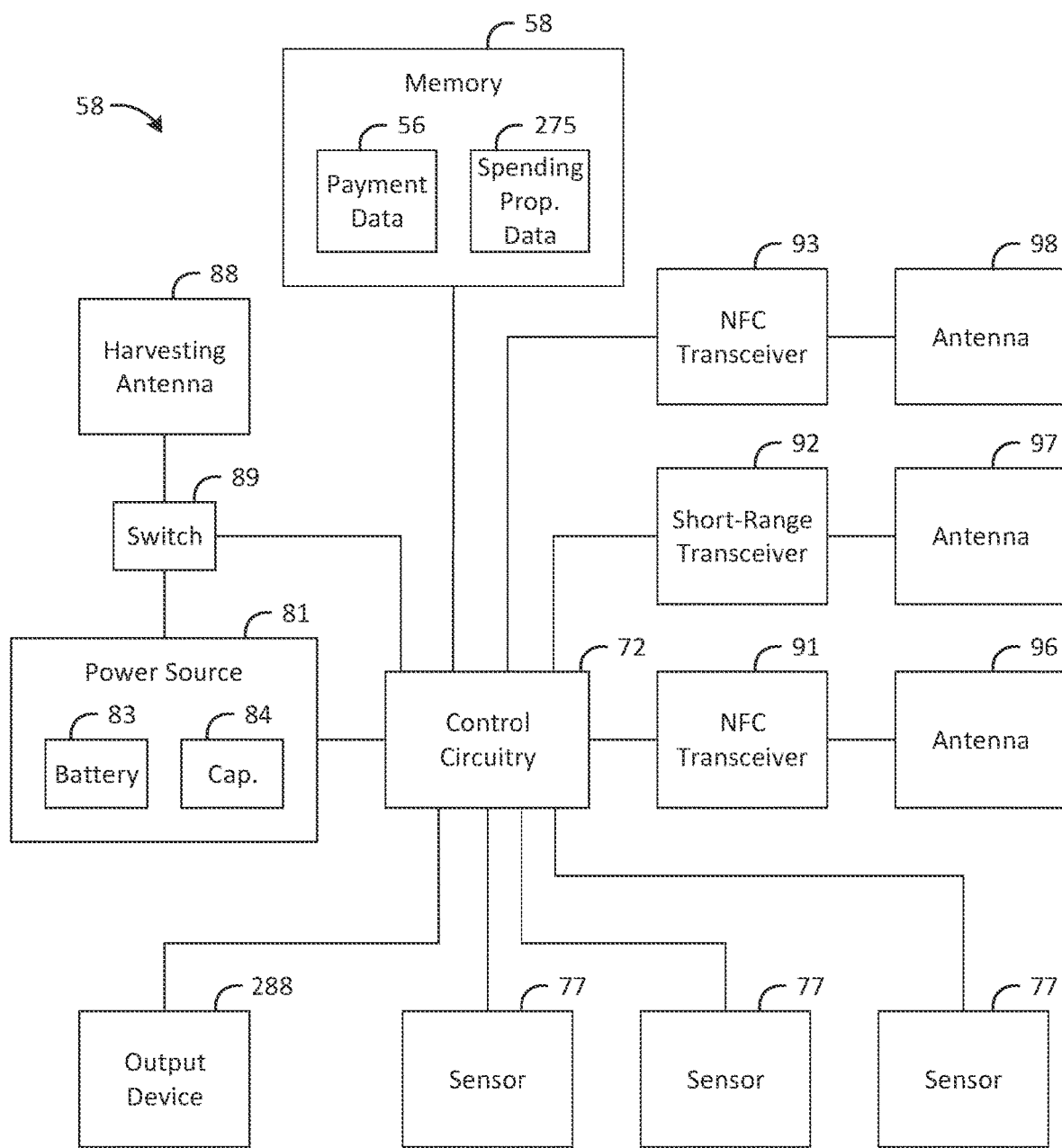
FIG. 20 depicts an illustrative block diagram of an electrical system, such as is depicted by FIG. 4, using an NFC antenna for passive load modulation and another NFC antenna for active load modulation.

In various embodiments described above, the ring 52 is shown as having an antenna 96 for NFC and an antenna 97 for a short-range protocol, such as Bluetooth. However, as noted above, the ring 52 may have any number of antennas for NFC or other types of communication. FIG. 20 shows an embodiment having an additional NFC transceiver 93 and antenna 98. In such embodiment, the NFC transceiver 91 and antenna 96 may be configured to communicate NFC signals with the payment reader 22 or other NFC device using active load modulation, and the NFC transceiver 93 and antenna 98 may be configured to communicate NFC signals with the payment reader 22 or other NFC device using passive load modulation. In some embodiments, the control circuitry 72 may be configured to select either active load modulation or passive load modulation based on any of various factors and, depending on which mode is selected, enable the NFC transceiver for the selected mode and disable the other NFC transceiver. Thus, at any time, the ring 52 may perform either passive load modulation or active load modulation, but not both so as to prevent interference between the two transceivers 91, 93 (assuming that they both communicate at the same frequency). Note that each of the antennas 96, 98 may be tuned with the circuit shown by FIG. 6 or other circuitry as may be desired.

As noted above, the selection of which load modulation to use may be based on any of various factors. For example, such selection may be based on the amount of energy stored in one or more components of the power source 81. In this regard, the control circuitry 71 may be configured to measure a charge level of the battery 83 and/or other components of the power source 81 and select passive load modulation if the measured energy level is below a predefined threshold in order to conserve power. That is, the control circuitry 72 may enable the NFC transceiver 93, which performs passive load modulation in the instant embodiment, and disable the NFC transceiver 91, which performs active load modulation in the instant embodiment. Further, when passive load modulation is attempted, the control circuitry 72 may be configured to determine a parameter indicative of the communication quality, such as a number of errors in the communicated data or amplitude measurement of a received signal. If the parameter is below a predefined threshold indicating that the communication quality is less than a desired amount, the control circuitry 72 may be configured to enable active load modulation and disable passive load modulation. That is, the control circuitry 72 may enable the NFC transceiver 91 and disable the NFC transceiver 93.

Various other techniques and factors for selectively enabling the NFC transceivers 91, 93 are possible in other embodiments.

In addition, the antenna 98 may also function as an energy harvesting antenna 98 in the same way as described above for the harvesting antenna 88, thereby obviating the need of having a harvesting antenna 88 separate from the antennas 96-98. In this regard, when the control circuitry 72 selects active load modulation, the control circuitry 72 may disable the NFC transceiver 93 from performing passive load modulation. In addition, before enabling the NFC transceiver 91 to perform active load modulation, the control circuitry 72 may tune the antenna 98 for optimal energy harvesting according to the techniques described above, and enable the antenna 98 to provide energy to the power source 81, as described above for the harvesting antenna 88. For example, although not explicitly shown by FIG. 20, the antenna 98 may be coupled to the power source 81 through a switch (not shown) as described above for the antenna 89, and this switch may be controlled to enable energy to flow from the antenna 98 to the power source 81 when energy harvesting is to occur. After harvesting energy for a time, the control circuitry 72 may then disable energy harvesting from the antenna 98 and enable the NFC transceiver 91 to perform active load modulation. Notably, antennas used for passive load modulation are often larger than and can harvest more power than antennas used for active load modulation. Thus, it is possible that use of the antenna 98 for harvesting can provide more power relative to antenna 96. If the control circuitry 72 instead selects passive load modulation, then the control circuitry 72 may tune the antenna 98 for optimization of passive load modulation, according to the tuning techniques described above, and disable the NFC transceiver 91.

Note that, in several embodiments described above, the circuitry of the ring 52 is shown as disparate blocks for illustrative purposes. It is unnecessary for the circuitry to be separated or segmented in any manner, and it is possible for the same set of circuitry to be used for multiple blocks. As an example, the term "circuitry" may be used to refer to any block of circuitry shown by the figures or to refer collectively to multiple blocks. As an example, circuitry may include a processor that is programmed with instructions for performing the functions described herein. Moreover, the same hardware resources, such as one or more processors or other types of circuitry, may be used to implement the functionality of multiple blocks.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A system for performing transactions, comprising:
  a wearable device having a ring for receiving a body part of a user, the ring having at least one antenna and electrical circuitry coupled to the at least one antenna, the electrical circuitry configured to wirelessly transmit, via the at least one antenna, information associated with the user for a transaction; and
  a reader configured to receive the information associated with the user from the electrical circuitry of the ring and to perform an action in response to the information associated with the user, the reader having a first marker indicating a first location for placement of a near field communication (NFC) device to communicate with the reader and a second marker, different from the first marker, indicating a second location for placement of the ring to communicate with the reader.

2. The system of claim 1, wherein the electrical circuitry authenticates the user prior to transmitting the information associated with the user.

3. The system of claim 2, wherein the electrical circuitry includes at least one sensor configured to detect a pulse of the user, and wherein the electrical circuitry is configured to authenticate the user based on the detected pulse.

4. The system of claim 1, wherein the information associated with the user is a user identifier that identifies the user.

5. The system of claim 4, wherein the action performed by the reader is tracking a clock-in or clock-out of the user at a place of employment of the user.

6. The system of claim 4, wherein the action performed by the reader is permitting the user to obtain access to an area.

7. The system of claim 4, wherein the user identifier is a photograph of the user.

8. The system of claim 7, wherein the reader is configured to display the photograph of the user to permit a person to confirm an identity of the user.

9. The system of claim 1, wherein the information associated with the user is an authorization code for an event and the action performed by the reader is granting the user access to the event.

10. The system of claim 9, further comprising a payment reader, wherein the payment reader transmits the authorization code for the event to the wearable device upon completion of a payment transaction between the payment reader and the wearable device.

11. The system of claim 1, wherein the information associated with the user is a token for a financial account of the user, and the action performed by the reader is providing the token to a payment server during a payment transaction.

12. A method for use with a wearable device, comprising:
  storing information associated with a user for a transaction in electrical circuitry of a ring of the wearable device, the ring configured to receive a body part of the user;
  wirelessly transmitting, via at least one antenna coupled to the electrical circuitry, the information associated with a user for the transaction by the electrical circuitry;
  receiving, by a reader, the information associated with the user from the electrical circuitry of the ring, the reader configured to have a first marker indicating a first location for placement of a near field communication (NFC) device to communicate with the reader and a second marker, different from the first marker, indicating a second location for placement of the ring to communicate with the reader; and performing, by the reader, an action in response to the information associated with the user.

13. The method of claim 12, further comprising authenticating the user prior to transmitting the information associated with the user.

14. The method of claim 13, wherein authenticating the user includes detecting a pulse of the user with at least one sensor of the electrical circuitry of the ring.

15. The method of claim 12, wherein the information associated with the user is a user identifier that identifies the user and performing the action includes tracking a clock-in or clock-out of the user at a place of employment of the user.

16. The method of claim 12, wherein the information associated with the user is a user identifier that identifies the user and performing the action includes permitting the user to obtain access to an area.

17. The method of claim 12, wherein the information associated with the user is a photograph of the user and performing the action includes displaying the photograph of the user to permit a person to confirm an identity of the user.

18. The method of claim 12, wherein the information associated with the user is an authorization code for an event and performing the action includes granting the user access to the event.

19. The method of claim 18, further comprising receiving, by the ring, the authorization code for the event from a payment reader upon completion of a payment transaction between the payment reader and the wearable device.

20. A wearable device for performing transactions, comprising:

a ring for receiving a body part of a user;

at least one antenna; and electrical circuitry positioned in the ring and configured to wirelessly transmit, via the at least one antenna, information associated with the user to a reader for a transaction, the reader configured to have a first marker indicating a first location for placement of a near field communication (NFC) device to communicate with the reader and a second marker, different from the first marker, indicating a second location for placement of the ring to communicate with the reader, wherein the reader is configured to perform an action in response to the received information associated with the user from the electrical circuitry.

* * * * *